US012755098B2

(12) United States Patent
Yuan et al.

(10) Patent No.: US 12,755,098 B2

(45) Date of Patent: Oct. 6, 2026

(54) TASK ATTENTION MECHANISM FOR CONTEXT WINDOW AUGMENTATION

(71) Applicant: International Business Machines Corporation, Armonk, NY (US)

(72) Inventors: Zhong Fang Yuan, Xi'An (CN); Chi Nan, Xi'An (CN); Tong Liu, Xi'An (CN); Li Juan Gao, Xi'An (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 302 days.

(21) Appl. No.: 18/591,979

(22) Filed: Feb. 29, 2024

(65) Prior Publication Data

US 2025/0278564 A1 Sep. 4, 2025

(51) Int. Cl.
*G06F 40/284* (2020.01)

(52) U.S. Cl.
CPC .................................. *G06F 40/284* (2020.01)

(58) Field of Classification Search
CPC ............................... G06F 40/284; G06F 40/30
See application file for complete search history.

(56) References Cited

U.S. PATENT DOCUMENTS 10,157,226 B1 * 12/2018 Costabello ............. G06N 5/022
10,325,597 B1 * 6/2019 Chevrier ................. G10L 15/06
10,838,992 B2 * 11/2020 Allen .................. G06F 16/3344
10,938,817 B2 3/2021 Han et al.
11,126,793 B2 9/2021 Gkotsoulia et al.
2007/0192095 A1 * 8/2007 Braho ..................... G10L 15/01
704/E15.009

(Continued)

FOREIGN PATENT DOCUMENTS

CN 111159416 B 7/2020

OTHER PUBLICATIONS

Sun et al., "Text Classification via Large Language Models" arXiv:2305.08377v3 Oct. 9, 2023 (20 pages).

(Continued)

*Primary Examiner* — Athar N Pasha

(74) *Attorney, Agent, or Firm* — Amin, Turocy & Watson, LLP

(57) ABSTRACT

One or more computer-implemented methods, computer systems and/or computer program products of use provided herein relate to employing a task attention mechanism for context window augmentation of a large language model (LLM). In various embodiments, a computer-implemented method comprises receiving, at a machine learning model, first text data. The computer-implemented method further comprises determining, via the machine learning model, a token length of the first text data. The computer-implemented method further comprises in response to determining that the token length is greater than a threshold token length of a first language machine learning model, generating via the machine learning model a first logical graph from the first text data, wherein the first logical graph incorporates tokens exceeding the threshold token length of the first language machine learning model without a portion of the first text data becoming eliminated, and the first logical graph is incorporated within the machine learning model.

15 Claims, 11 Drawing Sheets

(56) References Cited

U.S. PATENT DOCUMENTS

| | | | | |
|---|---|---|---|---|
| 2010/0076747 | A1* | 3/2010 | Appleyard | G10L 15/1815 704/235 |
| 2011/0129157 | A1* | 6/2011 | Xu | G06F 40/109 382/203 |
| 2018/0039696 | A1* | 2/2018 | Zhai | G06F 16/9024 |
| 2018/0052920 | A1* | 2/2018 | Klein | G06F 16/632 |
| 2019/0012405 | A1* | 1/2019 | Contractor | G06F 16/248 |
| 2019/0213284 | A1* | 7/2019 | Anand | G06F 3/0484 |
| 2019/0303498 | A1* | 10/2019 | Saha | G06F 16/367 |
| 2020/0089652 | A1* | 3/2020 | Jayaraman | G06N 20/00 |
| 2020/0364408 | A1* | 11/2020 | Lao | G06N 5/022 |
| 2021/0034988 | A1* | 2/2021 | Adel-Vu | G06N 5/022 |
| 2021/0035556 | A1 | 2/2021 | Shen et al. | |
| 2021/0064957 | A1* | 3/2021 | You | G06N 3/0895 |
| 2021/0117509 | A1* | 4/2021 | Aditya | G06F 40/30 |
| 2022/0318275 | A1* | 10/2022 | Jia | G06F 16/24578 |
| 2023/0033036 | A1* | 2/2023 | Han | G06F 16/7867 |
| 2023/0359825 | A1* | 11/2023 | Ramsl | G06N 5/022 |
| 2024/0257799 | A1* | 8/2024 | Zivkovic | G10L 15/08 |
| 2025/0156653 | A1* | 5/2025 | Yuan | G06F 16/3347 |
| 2025/0200630 | A1* | 6/2025 | Wang | G06N 3/0455 |
| 2025/0217672 | A1* | 7/2025 | Muro | G06N 5/022 |

OTHER PUBLICATIONS

Mohtashami et al., "Landmark Attention: Random-Access Infinite Context Length for Transformers" arXiv:2305.16300v2 Nov. 20, 2023 (19 pages).

Andrus et al., "Enhanced Story Comprehension for Large Language Models through Dynamic Document-Based Knowledge Graphs" The Thirty-Sixth AAAI Conference on Artificial Intelligence (AAAI-22) Jun. 28, 2022 (9 pages).

Hu et al., Empowering Language Models with Knowledge Graph Reasoning for Question Answering arXiv:2211.08380v1 Nov. 15, 2022 (20 pages).

Luo et al., "Reasoning On Graphs: Faithful And Interpretable Large Language Model Reasoning" arXiv:2310.01061v1 [cs.CL] Oct. 2, 2023 (22 pages).

Bulatov et al., "Scaling Transformer to 1M tokens and beyond with RMT" arXiv:2304.11062v1 Apr. 19, 2023 (9 pages).

* cited by examiner

TASK ATTENTION MECHANISM FOR CONTEXT WINDOW AUGMENTATION

BACKGROUND

The subject disclosure relates to machine learning and language machine learning models.

Large Language Models (LLMs) learn and understand large-scale natural language data, thereby greatly improving productivity for individuals.

The above-described background description is merely intended to provide a contextual overview regarding LLMs and is not intended to be exhaustive.

SUMMARY

The following presents a summary to provide a basic understanding of one or more embodiments described herein. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products that employ a task attention mechanism and a virtual memory graph to address a context window problem of LLMs are discussed.

According to an embodiment, a computer-implemented method is provided. The computer-implemented method comprises receiving, at a machine learning model, first text data. The computer-implemented method further comprises determining, via the machine learning model, a token length of the first text data. The computer-implemented method further comprises in response to determining that the token length is greater than a threshold token length of a first language machine learning model, generating via the machine learning model a first logical graph from the first text data, wherein the first logical graph incorporates tokens exceeding the threshold token length of the first language machine learning model without a portion of the first text data becoming eliminated, and the first logical graph is incorporated within the machine learning model. In the aforementioned computer-implemented method, the first logical graph is searchable for generating responses to one or more queries to the machine learning model.

According to another embodiment, a computer program product is provided. The computer program product comprises a set of one or more computer-readable storage media. The computer program product further comprises program instructions, collectively stored in the set of one or more computer-readable storage media, for causing a processor set to perform computer operations comprising inputting a first query into a machine learning model comprising a first logical graph, wherein the inputting causes the machine learning model to generate, via a first language machine learning model, a second logical graph from the first query, to search the first logical graph using the second logical graph, and to generate a response via the search of the first logical graph and via a task attention mechanism of the machine learning model. The computer operations further comprise receiving the response from the first query.

According to various embodiments, the above-described computer-implemented method can be implemented as a computer system or as a computer program product.

BRIEF DESCRIPTION OF DRAWINGS

One or more embodiments are described below in the Detailed Description section with reference to the following drawings.

DETAILED DESCRIPTION

Figure 1:
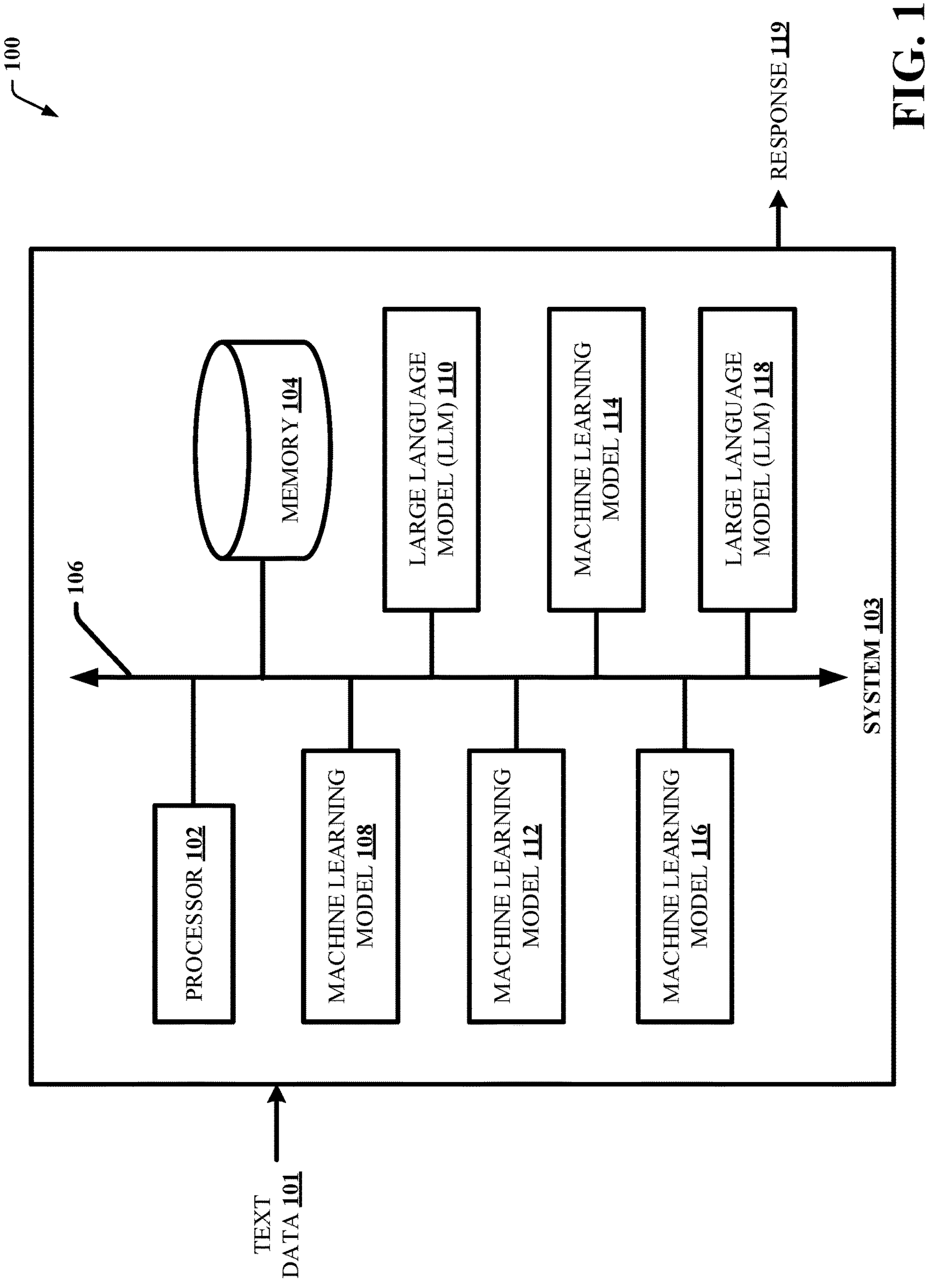
FIG. 1 illustrates a block diagram of an example, non-limiting system that employs a task attention mechanism and a virtual memory graph to generate a response to a query provided to an LLM in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

According to an embodiment, a computer-implemented method is provided. The computer-implemented method comprises receiving, at a machine learning model, first text data. The computer-implemented method further comprises determining, via the machine learning model, a token length of the first text data. The computer-implemented method further comprises in response to determining that the token length is greater than a threshold token length of a first language machine learning model, generating via the machine learning model a first logical graph from the first text data, wherein the first logical graph incorporates tokens exceeding the threshold token length of the first language machine learning model without a portion of the first text data becoming eliminated, and the first logical graph is incorporated within the machine learning model. In an aspect, the first logical graph is searchable for generating responses to one or more queries to the machine learning model. Such embodiments of the computer-implemented method provide a number of advantages including circumventing a context window limitation of machine learning models such as LLMs and enabling machine learning models to generate more accurate and contextually relevant outputs by enhancing both memory retrieval accuracy and logical reasoning capabilities of the machine learning models.

In one or more embodiments, the aforementioned computer-implemented method further comprises generating, via the machine learning model, subtexts from the portion of the first text data that exceeds the threshold token length of the first language machine learning model. In one or more embodiments, the aforementioned computer-implemented method further comprises generating, via the machine learning model, respective logical subgraphs from the subtexts. In one or more embodiments, the aforementioned computer-implemented method further comprises combining, via the machine learning model, the respective logical subgraphs to form the first logical graph. Such embodiments of the computer-implemented method additionally provide the advantage of circumventing a context window limitation of machine learning models such as LLMs.

In one or more embodiments of the aforementioned computer-implemented method, the respective logical subgraphs are generated based on a prompt template that is input into the first language machine learning model. In one or more embodiments of the aforementioned computer-implemented method, the subtexts are generated from the first text data via a semantic integrity-driven sliding window comprising a lightweight pointer neural network. In one or more embodiments of the aforementioned computer-implemented method, an input to the lightweight pointer neural network is sequence data, and an output of the lightweight pointer neural network is a probability value that indicates whether semantic integrity of the first text data is preserved during truncation of the first text data into the subtexts. Such embodiments of the computer-implemented method provide an advantage of ensuring that sentences of the first text data having the same meaning are included in a common subtext and that individual subtexts are semantically independent from one another.

In one or more embodiments of the aforementioned computer-implemented method, the first logical graph is formed further by converting textual distances in the first text data into logical distances in the first logical graph without limiting the first logical graph by the token length of the first text data. Such embodiments of the computer-implemented method additionally provide the advantage of circumventing a context window limitation of machine learning models such as LLMs.

In one or more embodiments, the aforementioned computer-implemented method further comprises storing a long-term memory of the first language machine learning model as a task attention mechanism of the first language machine learning model. Such embodiments of the computer-implemented method provide a number of advantages including improving processing efficiency of machine learning models to generate responses from a large knowledge base and improving accuracy of generating the responses, thereby causing machine learning models to generate more relevant responses.

In one or more embodiments of the aforementioned computer-implemented method, the first logical graph is stored in computer memory and serves as a logical index of knowledge comprised in the first text data for generating the responses to the one or more queries. Such embodiments of the computer-implemented method provide an advantage of reducing the amount of time needed by a machine learning model to respond to a query.

According to an embodiment, a computer program product is provided. The computer program product comprises a set of one or more computer-readable storage media. The computer program product further comprises program instructions, collectively stored in the set of one or more computer-readable storage media, for causing a processor set to perform computer operations comprising inputting a first query into a machine learning model comprising a first logical graph, wherein the inputting causes the machine learning model to generate, via a first language machine learning model, a second logical graph from the first query, to search the first logical graph using the second logical graph, and to generate a response via the search of the first logical graph and via a task attention mechanism of the machine learning model. The computer operations further comprise receiving the response from the first query. Such embodiments of the computer-implemented method provide a number of advantages including improving processing efficiency of machine learning models to generate responses to queries and reducing the amount of time needed by the machine learning model to respond to the queries.

In one or more embodiments of the aforementioned computer program product, the machine learning model generates the second logical graph by applying the first query to a prompt template that was used to generate the first logical graph. In one or more embodiments, the aforementioned computer program product further comprises extracting a subgraph set from the first logical graph, the subgraph set being isomorphic to the second logical graph. In one or more embodiments of the aforementioned computer program product, the subgraph set is identified as being isomorphic via graph structure matching by identifying matching nodes and relationships between the matching nodes in the first logical graph and the second logical graph. Such embodiments of the computer-implemented method provide an advantage of generating more accurate and contextually relevant outputs.

In one or more embodiments, the aforementioned computer program product further comprises, restoring continuous first text data from the first logical graph by inputting a matching portion of the first logical graph into a second language machine learning model. In one or more embodiments, the aforementioned computer program product further comprises inputting the continuous first text data and the first query into the first language machine learning model. Such embodiments of the computer-implemented method additionally provide the advantage of generating more accurate and contextually relevant outputs.

According to various embodiments, the above-described computer-implemented method and computer program product can be implemented as a computer system.

LLMs are typically deep learning models trained on large datasets comprising billions or trillions of words, for example, as opposed to small language models that are trained on millions of words. LLMs usually also have millions or billions of parameters, whereas small language models have fewer parameters. Thus, LLMs are much larger in terms of data size and model complexity as compared to small language models, and therefore, are also trained for much larger durations than smaller models. LLMs learn and understand large-scale natural language data, thereby greatly improving productivity for individuals. Despite their strong abilities to handle complex tasks, each LLM has a context window that limits the maximum token length that the LLM processes. For example, an LLM having a context window of 32K indicates that the LLM handles or processes only 32,000 words worth of information at a time. This means that if the context entered into the LLM by an entity (e.g., hardware, software, artificial intelligence (AI), a neural network, machine and/or a user) includes some larger amount of words such as 50,000 words, then all the text exceeding 32,000 words will be automatically discarded by the LLM, resulting in information loss. Various embodiments of the present disclosure provide techniques to efficiently circumvent the context window limitation of LLMs.

Embodiments described herein include computer systems, computer-implemented methods, and computer program products that convert ultra-long text into a knowledge graph and store the knowledge graph in memory, while ensuring that the logic of knowledge comprised in the ultra-long text is preserved. Ultra-long text refers to text data having a token length greater than the context window of an LLM. To convert the ultra-long text into the knowledge graph, the various embodiments herein split the ultra-long text into multiple subtexts, each having a token length shorter than the context window of the LLM, by employing a semantic integrity-driven sliding window. The semantic integrity-driven sliding window is an algorithm composed of a lightweight pointer neural network that splits the ultra-long text into the multiple subtexts, such that the multiple subtexts are semantically independent from one another. In various embodiments, the LLM processes the individual subtexts to convert the individual subtexts into respective subgraphs formed of triplets, and the subgraphs are combined to generate the knowledge graph. In various embodiments, the knowledge graph stored in memory plays the role of a logical index of knowledge in the process of generating a response to a query provided to an LLM. In various embodiments, since relationships between nodes in the knowledge graph are purely logical and not limited by the length of the original text, the graph is easily searchable, no matter how large the associated knowledge texts making up the ultra-long text are or no matter how great the text length is. Additionally, in various embodiments, a graph generated from a query is used to extract graph structure information from the knowledge graph, and the matched graph structure information is used to easily restore and reorganize text containing information that is useful to answer the query. In various embodiments, an LLM is then used to process the reorganized text and the query to perform complex task reasoning. The mechanism described in various embodiments herein generates query responses with good speed, effect and efficiency. As such, embodiments of the present disclosure enable efficient extraction and storage of information from lengthy texts and address token length limitations of LLMs. In various embodiments, the use of dynamic virtual memory graphs and joint reasoning enhances an LLM's ability to comprehend and respond to complex queries and overcome challenges posed by finite context windows. Embodiments of the present disclosure significantly improve the overall performance and versatility of an LLM in tasks requiring narrative comprehension and complex reasoning.

The embodiments depicted in one or more figures described herein are for illustration only, and as such, the architecture of embodiments is not limited to the systems, devices and/or computer-implemented operations depicted therein, nor to any particular order, connection and/or coupling of systems and/or devices depicted therein. For example, in one or more embodiments, the non-limiting systems described herein, such as non-limiting system 100 as illustrated at FIG. 1, and/or systems thereof, further comprise, are associated with and/or are coupled to one or more computer and/or computing-based elements described herein with reference to an operating environment, such as the operating environment 1000 illustrated at FIG. 10. For example, in one or more embodiments, non-limiting system 100 is associated with, such as accessible via, a computing environment 1000 described below with reference to FIG. 10, such that aspects of processing are distributed between non-limiting system 100 and the computing environment 1000. In one or more described embodiments, computer and/or computing-based elements are used in connection with implementing one or more of the systems, devices and/or computer-implemented operations shown and/or described in connection with FIG. 1 and/or with other figures described herein.

FIG. 1 illustrates a block diagram of an example, non-limiting system 100 that employs a task attention mechanism and a virtual memory graph to generate a response to a query provided to an LLM in accordance with one or more embodiments described herein.

In various embodiments, non-limiting system 100 comprises system 103 that is employed to use hardware and/or software to solve problems that are highly technical in nature (e.g., related to machine learning, neural networks, context windows of LLMs, etc.), that are not abstract and that cannot be performed as a set of mental acts by a human. Further, some of the processes performed may be performed by specialized computers to carry out defined tasks related to employing a task attention mechanism and a virtual memory graph to address a context window problem of LLMs. In various embodiments, system 103 is employed to solve new problems that arise through advancements in technologies mentioned above, and/or the like. System 103 provides technical improvements to deep learning systems by improving processing efficiency of an LLM to extract a response to a query from a large knowledge base and reducing an amount of time needed by the LLM to respond to a query. In various embodiments, an LLM is employed to process extensive contextual information to generate more accurate and contextually relevant outputs. The techniques described herein result in enhancing both memory retrieval accuracy and logical reasoning capabilities of the LLM, thereby addressing limitations in existing reasoning methods.

Discussion turns briefly to processor 102, memory 104 and bus 106 of system 103. For example, in one or more embodiments, system 103 comprises processor 102 (e.g., computer processing unit, microprocessor, classical processor, and/or like processor). In one or more embodiments, system 103, as described herein with or without reference to the one or more figures of the one or more embodiments, further comprises one or more computer and/or machine readable, writable and/or executable instructions that are executed by processor 102 to enable performance of one or more processes defined by such instruction(s).

In one or more embodiments, system 103 comprises a computer-readable memory (e.g., memory 104) operably connected to the processor 102. In various embodiments, memory 104 stores computer-executable instructions that, upon execution by processor 102, cause processor 102 and/or one or more machine learning models of system 103 (e.g., machine learning model 108, LLM 110, machine learning model 112, machine learning model 114, machine learning model 116 and/or LLM 118) to perform one or more actions. In one or more embodiments, memory 104 stores machine learning models (e.g., machine learning model 108, LLM 110, machine learning model 112, machine learning model 114, machine learning model 116 and/or LLM 118).

In various embodiments, system 103 and a machine learning model thereof as described herein, are communicatively, electrically, operatively, optically and/or otherwise coupled to one another via bus 106. In various embodiments, bus 106 comprises one or more of a memory bus, memory controller, peripheral bus, external bus, local bus, and/or another type of bus that employs one or more bus architectures. In various embodiments, one or more of these examples of bus 106 are employed. In one or more embodiments, system 103 is coupled (e.g., communicatively, electrically, operatively, optically and/or like function) to one or more external systems (e.g., a non-illustrated electrical output production system, one or more output targets, an output target controller and/or the like), sources and/or devices (e.g., classical computing devices, communication devices and/or like devices), such as via a network. In one or more embodiments, one or more of the machine learning models of system 103 reside in the cloud, and/or reside locally in a local computing environment (e.g., at a specified location(s)).

As described above, in various embodiments, system 103 comprises one or more computer and/or machine readable, writable and/or executable instructions that, when executed by processor 102, enable performance of one or more operations defined by such instruction(s). In various embodiments, system 103 is a multistage machine learning model and machine learning model 108, LLM 110, machine learning model 112, machine learning model 114, machine learning model 116 and LLM 118 are various machine learning models of system 103, such that system 103 is available to an end entity (e.g., hardware, software, AI, a neural network, machine and/or a user) as a machine learning-based application or service. Although the operations performed by system 103 as a multi-stage machine learning model are described in greater detail infra with reference to the individual machine learning models comprised in system 103, the following description provides a general explanation. For example, in various embodiments, system 103 performs the processing step of generating the first logical graph by transforming data comprising a plurality of subgraphs in the triplet format into a common knowledge graph in the triplet format based on semantic similarity of nodes in the subgraphs. For example, in various embodiments, the plurality of subgraphs represent data from text data 101 in the triplet format. In various embodiments, text data 101 is truncated into a plurality of subtexts having respective token lengths that are smaller than a context window of a first language machine learning model (e.g., LLM 110). In various embodiments, this allows the first language machine learning model to ingest and convert each of the plurality of subtexts into the respective subgraphs that are then combined into the first logical graph. In this regard, generating the first logical graph results in an additional transformation wherein textual distances in text data 101 are transformed into logical distances within the first logical graph. For example, in various embodiments, information from text data 101 is transformed from natural language data into data in the triplet format, which is processed by system 103 as code. In various embodiments, system 103 generates response 119 based on information from the first logical graph and a query. For example, in various embodiments, system 103 uses a query graph representing the query in the triplet format to extract from the first logical graph, a subgraph set that is isomorphic to the query graph. In various embodiments, system 103 restores continuous text data from the extracted subgraph set. In various embodiments, system 103 utilizes a second language machine learning model (e.g., LLM 118) to restore the continuous text data by inputting the subgraph set into the second language machine learning model. In this regard, in at least some embodiments, LLM 118 is also a machine learning model that transforms the logical data represented by the subgraph set in the triplet format into the continuous text data in the natural language format, which is obtained as reorganized text. In at least some embodiments, LLM 110 is yet another machine learning model that ingests data comprising the reorganized text and the query to generate response 119.

In various embodiments, machine learning model 108 is used to generate a first logical graph from text data 101. This generation occurs in some embodiments in response to a determination that text data 101 has a token length greater than a threshold token length of LLM 110 (a first LLM). Herein, the threshold token length of LLM 110 refers to the context window of LLM 110, and the terms 'threshold token length,' and 'context window' have been used interchangeably throughout this specification. The context window of an LLM is described as the maximum number of words that are accepted by the LLM at any given time for a task. One usage of an LLM is in retrieval-augmented generation (RAG) wherein an LLM accesses a knowledge base, outside of training data provided to the LLM, before generating a response to a query, and such a knowledge base is provided to the LLM as a context that is input to the LLM by an entity (e.g., hardware, software, AI, a neural network, machine and/or a user) employing the LLM for a task. The context window exists as a limitation inside the LLM. The LLM computes a token size/token length (i.e., number of words, token count of tokens generated from all of the portions of the text data/corpus that is input, etc.) of information input to the LLM as context, and if the token size/length is greater than the context window of the LLM, the LLM discards excess text from the information input to the LLM. Thus, a knowledge base comprised of big data or having hundreds or tens of thousands of passages of information or content, for example, would need to be handled by an entity in parts to prevent the LLM from abandoning the excess content. In other words, some part of a context or information input to an LLM is appended or forgotten by the LLM, if the context or the information is greater than the context window of the LLM. In various embodiments, to address the problem of the context window limitation, text data 101 having a token length greater than the context window of LLM 110 is converted into the first logical graph, and the first logical graph is accessed by the LLM 110 or another LLM to generate response 119 to a query. In various embodiments, this is equivalent to increasing the context window of LLM 110 to prevent LLM 110 from discarding excess text of text data 101.

In various embodiments, generating the first logical graph comprises truncating text data 101 into a plurality of subtexts having respective token lengths smaller than the threshold token length of LLM 110. For example, in various embodiments, a semantic integrity-driven sliding window, which is an algorithm composed of a lightweight pointer neural network, is employed to truncate text data 101 into a plurality of subtexts. In at least some embodiments, an input to the lightweight pointer neural network is sequence data, and an output of the lightweight pointer neural network is a probability value that indicates whether semantic integrity of text data 101 is preserved during truncation of text data 101 into the plurality of subtexts. Splitting an original text such as text data 101 is achievable via various methods such as, for example, by splitting the original text into individual sentences, etc., but doing so often affects the semantic integrity of the original text. In this regard, in various embodiments, the lightweight pointer neural network ensures that each subtext (elsewhere, subtext or text chunk) of the plurality of subtexts is semantically independent from other subtexts of the plurality of subtexts and that each subtext includes information about only one subject. For example, in an embodiment, the lightweight pointer neural network combines the sentences "Tom is a cat," "Jerry is a mouse," "Jerry likes cheese," etc. into one subtext or text chunk because all the sentences are related to the cartoon Tom and Jerry. In various embodiments, truncation of text data 101 is performed as a pre-processing step.

In various embodiments, the lightweight pointer neural network splits each sentence of text data 101 into individual tokens to truncate text data 101 into the subtexts. For example, the lightweight pointer neural network splits the sentence "He loved to eat" into individual words "he," "loved," "to," and "eat." In various embodiments, the individual tokens are accessible to and input into an encoder of the lightweight pointer neural network and the encoder generates an output for the individual words. The output of an encoder is called an embedding which is a series number, and the embedding is a digital representation of the sentence. For example, in various embodiments, for each word processed by the encoder, the encoder generates a numerical value (e.g., 0.1, 0.3, etc.) that is an embedding for the word. The embeddings generated by the encoder have multiple dimensions, e.g., are 128-dimensional embeddings or 256-dimensional embeddings.

In various embodiments, by employing the embeddings generated by the encoder, a decoder of the lightweight pointer neural network generates another token series, such as a series number. The token series number is not limited to specific values or ranges; however, in various embodiments, a softmax layer is implemented to reduce the scope of the token series number between zero (0) and one (1). In doing so, the decoder of the lightweight pointer neural network identifies/generates a start word and an end word of a paragraph to form a subtext. For example, in an embodiment, in a paragraph of text data 101 including five sentences, the decoder marks respective start words and end words in individual sentences of the paragraph, to indicate the sentences that are to be combined into a single subtext. For example, in an embodiment, the decoder marks a word in the first sentence of the paragraph as the start word and a word in the third sentence of the paragraph as the end word of a subtext, indicating that information from the first three sentences of the paragraph is to be combined into one subtext. Similarly, the decoder marks a word in the fourth sentence of the paragraph as the start word and a word in the fifth sentence of the paragraph as the end word of a subtext, indicating that information from the fourth and fifth sentences of the paragraph is to be combined into another subtext. In doing so, the decoder splits the paragraph from text data 101 into a subtext having three sentences and another subtext having 2 sentences. Thus, in various embodiments, the lightweight pointer neural network splits text data 101 into subtexts having respective token lengths smaller than the threshold token length of LLM 110.

In various embodiments, the plurality of subtexts derived from text data 101 and having respective token lengths smaller than the threshold token length of LLM 110 are accessible to and input into the LLM 110, and LLM 110 converts the plurality of subtexts, into respective logical subgraphs, based on a prompt template. For example, in various embodiments, individual subtexts and a prompt template are input (e.g., by a machine learning model of system 103 or non-illustrated machine learning model) to LLM 110 or accessed by LLM 110 to generate individual subgraphs. In at least some embodiments, the prompt template is formed of three parts including instructions for LLM 110, a format corresponding to the instructions, and background information. In various embodiments, the background information includes the individual subtexts, and the instructions inform LLM 110 to convert each subtext into respective subgraphs according to the format. In at least some embodiments, the format is defined by an entity (e.g., hardware, software, AI, a neural network, machine and/or a user) and ensures that each subtext has the same format when converted to a subgraph. In various embodiments, based on the prompt template, LLM 110 converts the plurality of subtexts into respective logical subgraphs. When generating the subgraphs, LLM 110 discards unnecessary words, without discarding useful information. In various embodiments, a subgraph of the respective logical subgraphs generated by LLM 110 is a triplet graph. That is, in various embodiments, the subgraph has a triplet format. In some embodiments, a triplet refers to an [entity]-[relationship]-[entity] connection, wherein each node of the subgraph represents an entity of the corresponding subtext and an edge connecting two entities in the subgraph indicates a relationship between the two entities. In other embodiments, the triplet refers to an [entity]-[relationship]-[relationship attribute]-[entity] connection, wherein the relationship attribute is an attribute of the relationship between two entities in the subgraph. In various embodiments, processing code for causing a processor to perform a method of processing ultra-long text into entity A+relationship+relationship attribute+entity B is stored in memory.

In various embodiments, the respective logical subgraphs generated by LLM 110 are then combined into the first logical graph by machine learning model 108. For example, in various embodiments, machine learning model 108 uses an algorithm to combine the respective logical subgraphs into the first logical graph based on semantic similarity of nodes in the respective logical subgraphs. For example, in various embodiments, a common node representing a common entity (e.g., the word "apple") in two different subgraphs becomes a point of connection to combine the subgraphs into the first logical graph. In various embodiments, generating the first logical graph converts textual distances in text data 101 into logical distances in the first logical graph without limiting the first logical graph by the token length of text data 101, which allows the first logical graph to be searched to generate response 119 regardless of the token length of text data 101. Moreover, in various embodiments, machine learning model 108 generates the first logical graph such that, for example, the first logical graph that is generated as text data 101 is input into or accessed by system 103.

In various embodiments, generating response 119 is based on the first logical graph by employing a task attention mechanism, such that text data 101 is utilized in generating response 119 without a portion of text data 101 becoming eliminated. In various embodiments, generating response 119 based on the first logical graph by employing the task attention mechanism comprises employing a long-term memory of the LLM 110 as the task attention mechanism. An attention mechanism refers to a computational mechanism in neural network architectures that allows a model to focus on specific parts of input data when generating outputs and weight different parts of the input data differently based on a task. A task attention mechanism is a specialized or adapted version of a conventional attention mechanism and is specifically designed to handle a certain task or a set of related tasks. The main difference between task attention mechanisms and regular attention mechanisms is that the former are tailored to the requirements of a specific problem, potentially considering task-specific features or constraints to improve the performance and efficiency of target tasks. In this regard, the task attention mechanism amplifies, for LLM 110, content that is closely related to the task. In various embodiments, a long-term memory of LLM 110 is stored (e.g., by a machine learning model of system 103 or a non-illustrated machine learning model) as a task attention mechanism and a virtual memory map (e.g., the first logical graph). In various embodiments, storing the long-term memory of LLM 110 as a task attention mechanism and a virtual memory map implies causing LLM 110 to focus on a task and not on the context, as the various embodiments discussed herein enable this process. For example, in one or more embodiments, storing the long-term memory (or long-term logical memory) of LLM 110 as the task attention mechanism indicates that LLM 110 employs the long-term memory as a mechanism to focus on and process specific information relevant to the task to work on the task. In various embodiments, the task attention mechanism assists LLM 110 to focus more effectively on parts of data input to LLM 110 that are relevant to a specific task when processing large amounts of input data. In this case, storing the long-term memory of LLM 110 as a task attention mechanism improves efficiency and accuracy when processing queries, thereby generating more relevant and accurate responses for users. The memory of an LLM is defined as the text that the LLM remembers such that, for example, after running a long dialogue by the LLM, the LLM recognizes a next step or dialogue or a next-to-next step or dialogue, and so on in a subsequent interaction, based on the LLM's memory of the long dialogue in the previous interaction. The memory of the LLM, which is the text window that the LLM remembers or recognizes, is very similar to the context window of the LLM. In this regard, the long-term memory of the LLM refers to a context window of more than 4000 words. By converting text data 101 into the first logical graph, various embodiments herein aim to increase the context window of LLM 110. For example, various embodiments herein aim for LLM 110 (or another LLM) to remember very long-term information, such as to remember the beginning of a book after LLM 110 has finished processing information from the book (i.e., reading the entire book). Further, as stated above, the various embodiments herein target a task driven long-term memory, to cause LLM 110 to focus on a task, but not the context itself. In other words, in various embodiments, the LLM learns to organize information by the task. For example, in an embodiment, an entity (e.g., hardware, software, AI, a neural network, machine and/or a user) interacting with LLM 110 queries LLM 110 about various subjects. At the beginning of the interaction, the entity queries LLM 110 about weather, towards the middle of the interaction, the entity queries LLM 110 about a specific industry, and towards the end of the interaction, the entity queries LLM 110 about a specific technology. Despite the information from the interaction being mixed in or distributed in dialogues, in various embodiments, a task driven long-term memory allows LLM 110 to organize the dialogues or chat history in a context, by a task or topic, and not by a sequence of the interactions.

In various embodiments, the first logical graph is stored (e.g., by machine learning model 108), in computer memory, to serve as a logical index of knowledge comprised in text data 101 to generate response 119 to a query. In an embodiment, the first logical graph is a virtual graph or a virtual knowledge graph that exists in memory for fast access, and in another embodiment the first logical graph is cached on a disk as accumulated knowledge. In at least some embodiments, the process of generating triplet graphs or subgraphs from subtexts generated by truncating the ultra-long text, to parse ultra-long text such as text data 101, adds additional time complexity to/increases a time consumed by the overall process. However, upon generating the virtual knowledge graph and combining the virtual knowledge graph with an LLM (e.g., LLM 110 or another LLM) to perform reasoning, the time complexity/time consumed by the overall process for the reasoning is greatly reduced. In various embodiments, from a long-term perspective, the increase in time consumed by the overall process is minimal. For example, after testing, the extra storage space occupied by generating the triplets was not found to be very large and was about 2-3 times that of the original long text. In various embodiments, the memory space occupied after generating the triplets is about 20 megabytes (MB)-30 MB.

In various embodiments, machine learning model 112 is used to generate response 119 to the query, based on the first logical graph, by employing the task attention mechanism. Generating response 119 comprises generating a second logical graph based on the query. In various embodiments, the second logical graph is known as a query graph. In various embodiments, the second logical graph is a triplet graph that is generated by LLM 110 from the query by employing the prompt template used to generate the first logical graph. That is, in various embodiments, LLM 110 generates the second logical graph from the query by processing the query, based on the same prompt template used to generate the respective subgraphs. For example, in various embodiments, a prompt template is input (e.g., by a machine learning model of system 103 or a non-illustrated machine learning model) to LLM 110 or accessed by LLM 110, wherein the prompt template comprises instructions for LLM 110, a format corresponding to the instructions, and background information. The background information includes the query, and the instructions inform LLM 110 to convert the query into the second logical graph according to the format. In various embodiments, the second logical graph or query graph is used to extract a subgraph set from the first logical graph. For example, in various embodiments, machine learning model 114 uses the second logical graph in the task attention mechanism to perform graph structure matching to extract from the first logical graph, a subgraph set that is isomorphic to the second logical graph. In various embodiments, machine learning model 114 employs subgraph isomorphism to extract the subgraph set from the first logical graph by identifying matching nodes and relationships between the matching nodes in the first and second logical graphs. Subgraph isomorphism is a graph matching method whereby a small graph is used to match nodes and relations in a bigger graph to generate/extract a subgraph.

In various embodiments, system 103 decides to check the first logical graph, based on some specific conditions or strategies, when processing the query to generate response 119. In at least some embodiments, the conditions are based on similarity, correlation, or other measures between the query input to system 103 and information/knowledge stored in the first logical graph. In some embodiments, system 103 first preprocesses or analyzes a query via LLM 110 to determine whether the query is sufficiently relevant to the information in the first logical graph. For example, if the query is not relevant to the knowledge in the first logical graph, LLM 110 chooses to skip or stop checking the first logical graph, thereby saving computing resources and speeding up a response time to respond to the query. In other embodiments, system 103 defaults to checking the first logical graph via LLM 110, but during the checking process, if the query is found to be less relevant to the information/knowledge stored in the first logical graph, LLM 110 terminates the check early during the process and attempts other methods to respond to the query. The specific implementation varies in different embodiments depending on a model design of LLM 110 and application scenarios. In general, system 103 employs relevant strategies or mechanisms to decide whether to check the first logical graph in order to improve processing efficiency while ensuring response quality.

In at least some embodiments, by implementing the techniques disclosed herein to employ the virtual knowledge graph and the query graph (i.e., the first and second logical graphs, respectively), system 103 combines distant entities from text data 101 into a single graph, for example, in a single subgraph of the subgraph set. For example, in an embodiment, a subgraph of the subgraph set comprises a node corresponding to an entity that appears at the beginning of text data 101, another node corresponding to an entity that appears in the middle of text data 101, and a third node corresponding to an entity that appears at the end of text data 101, wherein text data 101 comprises numerous text documents and vast amounts of information. In various embodiments, system 103 organizes such distant entities into a single subgraph. It is to be appreciated that in various embodiments, the first logical graph, second logical graph and the subgraphs appear as some form of code to an LLM or a machine learning model.

In various embodiments, after extraction of the subgraph set, continuous text is restored from the subgraph set. In various embodiments, the subgraph set also comprises triplets. In various embodiments, restoring the continuous text from the subgraph set is achieved via various methods. For example, as stated above, the subgraph set with entities, relations, and relationship attributes appears as code (e.g., in a JavaScript Object Notation (JSON) format) to an LLM or a machine learning model in various embodiments. In some embodiments, machine learning model 116 uses certain rules and conversion methods to convert the code into regular text. For example, machine learning model 116 uses some rules or a template to convert the subgraph set into sentences. Because a triplet is a very logical representation, the triplet is synthesized into a sentence very logically. In other embodiments, a prompt template is provided to LLM 118 (a second LLM), wherein the prompt template instructs LLM 118 to translate triplets into continuous text data. For example, machine learning model 116 restores continuous text data from the subgraph set by inputting the subgraph set into LLM 118, wherein the continuous text data is obtained as reorganized text. In various embodiments, machine learning model 112 inputs the reorganized text and the query as part of another prompt template into LLM 110 (or another LLM) to generate response 119 to the query.

Thus, in various embodiments, system 103 converts a large knowledge base having a token length greater than a context window of an LLM into a virtual knowledge graph that is used by the LLM to scan useful information from the knowledge base, without appending information exceeding the context window of the LLM. As a result, in various embodiments, a context is organized into a knowledge graph with triplets, and a query is converted into a query graph to extract a subgraph set from the knowledge graph. In various embodiments, this technique is used to define a topic, task, or intention to search the knowledge graph. In various embodiments, before inputting the large knowledge base into the LLM, system 103 truncates the knowledge base into subtexts. In various embodiments, various methods are used to truncate or split the knowledge base. In various embodiments, after splitting the text, the text is input into the LLM, and the LLM uses prompt engineering to convert each subtext into a triplet graph formed of entities and relationships between the entities. In various embodiments, the individual triplet graphs are combined into the virtual knowledge graph that is then used in a task attention mechanism to generate a response to a query. While compiling a knowledge base having a single document into a prompt template is relatively simple, a knowledge base with numerous documents is much more challenging to navigate. For example, various embodiments herein assist in identifying the most useful information from a large knowledge base having several documents (e.g., 10,000 portable document formats (PDFs) with each PDF having 1 page, 10 pages, 20 pages, etc.) and combining such information into a prompt template that is input into an LLM to generate a response to a query.

Figure 2:
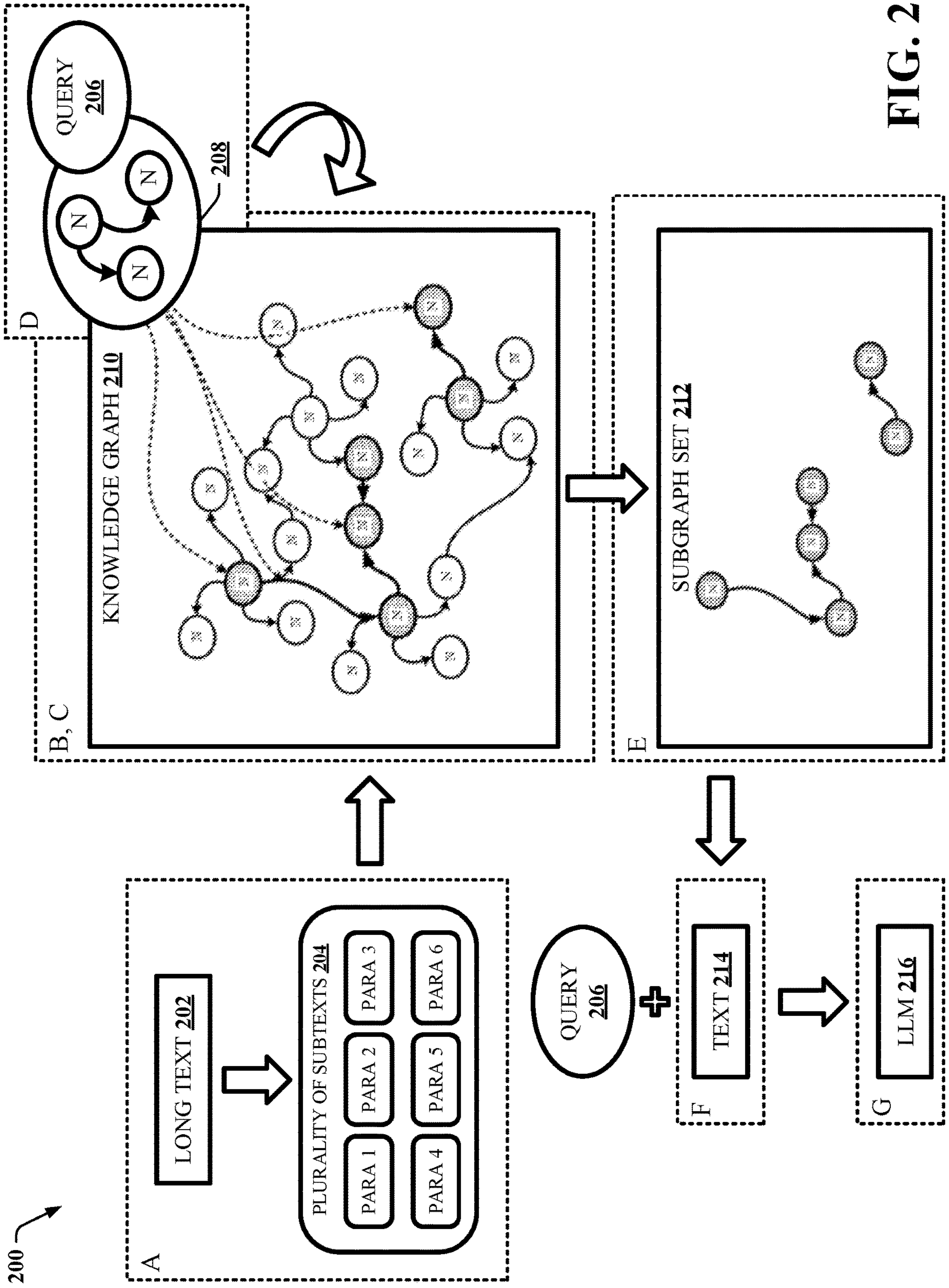
FIG. 2 illustrates a flow diagram of an example, non-limiting process of generating a virtual memory graph and employing a task attention mechanism to generate a response to a query provided to an LLM by employing the virtual memory graph in accordance with one or more embodiments described herein.

FIG. 2 illustrates a flow diagram of an example, non-limiting process 200 of generating a virtual memory graph and employing a task attention mechanism to generate a response to a query provided to an LLM by employing the virtual memory graph in accordance with one or more embodiments described herein. One or more embodiments described with respect to FIG. 2 are enabled by system 103 of FIG. 1. Repetitive description of like elements and/or processes employed in respective embodiments is omitted for sake of brevity.

With continued reference to FIG. 1, long text 202 represents text data having a token length longer than the context window of a first LLM (e.g., LLM 110, LLM 216 or another LLM), based on which an entity desires to generate a response to a query by employing the LLM to search long text 202. In various embodiments, machine learning model 108 generates knowledge graph 210 (e.g., first logical graph or virtual graph) from long text 202. In various embodiments, generating knowledge graph 210 comprises truncating long text 202 into plurality of subtexts 204 comprising subtexts having respective token lengths smaller than the context window/maximum token limit of the LLM. For example, in various embodiments, a semantic integrity-driven sliding window (or sliding window driven by semantic integrity), which is an algorithm composed of a lightweight pointer neural network, truncates long text 202 into plurality of subtexts 204 as a part of or in response to long text 202 being input into a system (e.g., system 103). The semantic integrity-driven sliding window is different from a traditional length-based sliding window. This concept is described in greater depth infra with respect to FIG. 4.

In various embodiments, an input to the lightweight pointer neural network is sequence data, and an output of the lightweight pointer neural network is a probability value that indicates whether semantic integrity of long text 202 is preserved during truncation of long text 202 into plurality of subtexts 204. In other words, the probability value indicates whether the text in plurality of subtexts 204 has semantic integrity. Stated differently, the probability value determines whether the sliding window destroys the semantic integrity of continuous text from long text 202 when truncating long text 202. In FIG. 2, plurality of subtexts 204 is illustrated as having six paragraphs/subtexts/text chunks/text fragments (e.g., para 1, para 2, . . . , para 6); however, in various embodiments, long text 202 is truncated into additional or fewer paragraphs in different scenarios. Further, in various embodiments, each paragraph of long text 202 has one or more sentences.

In various embodiments, the lightweight pointer neural network ensures that subtexts or text chunks of plurality of subtexts 204 are semantically independent from one another and that each subtext includes information about only one subject. For example, in an embodiment, the lightweight pointer neural network is expected to combine the sentences "Tom is a cat," "Jerry is a mouse," "Jerry likes cheese," etc. into one subtext or text chunk because all the sentences discuss the cartoon Tom and Jerry. In some embodiments, a LangChain® text splitter is used to split the large text, wherein the text splitter is an algorithm that splits one large paragraph into smaller subtexts. The text splitter works similar to a text clustering method and sequentially scans every sentence in a paragraph to ensure that sentences in a subtext have sequential semantic meaning. In various embodiments, truncation of long text 202 is performed as a pre-processing step. For example, in various embodiments, long text 202 is truncated or split into plurality of subtexts 204 before long text 202 is input to the LLM.

In various embodiments, truncation of long text 202 allows the LLM to automatically extract logical information from long text 202 to generate knowledge graph 210 that is saved in memory as a memory map. For example, in various embodiments, the LLM converts each subtext from plurality of subtexts 204 into respective logical subgraphs, based on a prompt template. For example, in various embodiments, a prompt template is constructed and input to the LLM (e.g., by a machine learning model). In various embodiments, the prompt template has three parts, including instructions for the LLM, a format corresponding to the instructions and background information. The background information includes individual subtexts from plurality of subtexts 204, and the instructions inform the LLM to convert each subtext into respective subgraphs according to the format. In at least some embodiments, the format is defined by an entity (e.g., hardware, software, AI, a neural network, machine and/or a user) and ensures that each subtext has the same format when converted to a subgraph. In various embodiments, various types of instructions are used in the prompt template. In various embodiments, based on the prompt template, the LLM processes each subtext into respective subgraphs. It is to be appreciated that, in various embodiments, original text (e.g., from long text 202) reflecting the relationships between entities is used to generate the subgraphs, as the properties of the relationships are saved at the same time.

In various embodiments, the LLM discards unnecessary words without discarding useful information when generating the subgraphs. In various embodiments, a subgraph of the respective logical subgraphs generated by the LLM is a triplet graph. That is, the subgraph has a triplet format. A triplet refers to an [entity]-[relationship]-[entity] connection, wherein each node of the subgraph represents an entity of the corresponding subtext and an edge connecting two entities in the subgraph indicates the relationship between the two entities. A triplet also refers to an [entity]-[relationship]-[relationship attribute]-[entity] connection, wherein the relationship attribute is an attribute of the relationship between two entities in the subgraph. In various embodiments, processing code that causes a processor to perform a method of processing ultra-long text into entity A+relationship+relationship attribute+entity B is stored in memory. In various embodiments, the respective logical subgraphs generated by the LLM are then combined into knowledge graph 210. For example, in various embodiments, machine learning model 108 uses an algorithm to combine the respective logical subgraphs into knowledge graph 210 based on semantic similarity of nodes in the respective logical subgraphs. For example, in various embodiments, a common node representing a common entity (e.g., apple) in two different subgraphs becomes a point of connection for the subgraphs.

In various embodiments, knowledge graph 210 is stored (e.g., by a machine learning model) in computer memory, to serve as a logical index of knowledge comprised in long text 202 to generate a response to query 206. In an embodiment, knowledge graph 210 is a virtual graph or a virtual knowledge graph that exists in memory for fast/rapid access. In another embodiment, knowledge graph 210 is cached on a disk as accumulated knowledge. In various embodiments, to parse ultra-long text such as long text 202, the process of generating triplet graphs or subgraphs from subtext generated by truncating the ultra-long text increases the time consumed by the overall process. However, upon generating the virtual knowledge graph and combining the virtual knowledge graph with an LLM to perform reasoning, the time required for the reasoning is greatly reduced. Thus, in various embodiments, from a long-term perspective, the increase in time consumed by the overall process is minimal. For example, during testing, the extra storage space occupied by generating the triplets was not found to be very large and was about 2-3 times that of the original long text. In at least some embodiments, the memory space occupied after establishment is about 20 MB-30 MB.

In various embodiments, a long-term memory of the LLM is stored (e.g., by a machine learning model) as a task attention mechanism and a virtual memory map (e.g., knowledge graph 210). A task attention mechanism is a specialized or adapted version of a conventional attention mechanism and is specifically designed to handle a certain task or a set of related tasks. The main difference between task attention mechanisms and regular attention mechanisms is that the former are tailored to the requirements of a specific problem, potentially considering task-specific features or constraints to improve the performance and efficiency of target tasks. In this regard, the task attention mechanism amplifies, for the LLM, content that is closely related to the task. Storing the long-term memory of the LLM as a task attention mechanism implies causing the LLM to focus on a task and not on the context itself. For example, in one or more embodiments, storing the long-term memory (or long-term logical memory) of the LLM as the task attention mechanism indicates that the LLM employs the long-term memory as a mechanism to focus on and process specific information relevant to the task to work on the task. In various embodiments, the task attention mechanism assists the LLM to focus more effectively on parts of data input to the LLM that are relevant to a specific task when processing large amounts of input data. In this case, storing the long-term memory of the LLM as a task attention mechanism improves efficiency and accuracy when processing queries, thereby generating more relevant and accurate responses for users. The memory of an LLM is defined as the text that the LLM remembers. For example, after running a long dialogue by the LLM, the LLM recognizes a next step or dialogue or a next-to-next step or dialogue, and so on in a subsequent interaction, based on the LLM's memory of the long dialogue in the previous interaction. The memory of the LLM, which is the text window that the LLM remembers or recognizes, is very similar to the context window of the LLM. In this regard, the long-term memory of the LLM refers to a context window of more than 4000 words. By converting text data having a token length greater than a context window of an LLM into a logical graph, various embodiments herein aim to increase the context window of the LLM. For example, various embodiments herein aim for the LLM to remember very long-term information, such as to remember the beginning of a book after the LLM has finished processing information from the book (i.e., reading the entire book). Further, the various embodiments herein target a task driven long-term memory, to cause the LLM to focus on a task, but not the context itself. In other words, in various embodiments, the LLM learns to organize information by the task. For example, in an embodiment, when interacting with an LLM, an entity (e.g., hardware, software, AI, a neural network, machine and/or a user) queries the LLM about various subjects. At the beginning of the interaction, the entity queries the LLM about weather, towards the middle of the interaction, the entity queries the LLM about an industry, and towards the end of the interaction, the entity queries the LLM about a specific technology. Despite the information from the interaction being mixed in dialogues, in various embodiments, a task driven long-term memory allows the LLM to organize the dialogues or chat history in a context, by a task or topic, and not by a sequence of the interactions.

Thus, in various embodiments, upon inputting long text 202 into the LLM as plurality of subtexts 204, knowledge graph 210 is obtained. In various embodiments, machine learning model 112 is used to generate a response to query 206, based on the knowledge graph 210, by employing the task attention mechanism. In various embodiments, generating the response to query 206 comprises generating query graph 208 (e.g., second logical graph) based on query 206. In various embodiments, query graph 208 is a triplet graph generated from query 206 by employing a prompt template used to generate knowledge graph 210. For example, in various embodiments, the LLM (e.g., LLM 110, LLM 216 or another LLM) generates query graph 208 from query 206 by processing query 206, based on the same prompt template used to generate the respective subgraphs from plurality of subtexts 204. For example, in various embodiments, a machine learning model inputs a prompt template into the LLM, wherein the prompt template comprises instructions for the LLM, a format corresponding to the instructions, and background information. The background information includes query 206, and the instructions inform the LLM to convert query 206 into query graph 208 according to the format. In various embodiments, query graph 208 is used to extract a subgraph set from knowledge graph 210. For example, in various embodiments, machine learning model 114 uses query graph 208 to perform graph structure matching to extract from knowledge graph 210, subgraph set 212, wherein subgraph set 212 is isomorphic to query graph 208. In various embodiments, machine learning model 114 employs subgraph isomorphism to extract subgraph set 212 by matching nodes and relationships between knowledge graph 210 and query graph 208 and highlighting the matched entities and relationships.

In various embodiments, after extraction of subgraph set 212, continuous text is restored from the subgraph set as text 214. This is achieved via various methods. For example, subgraph set 212 with entities, relations, and relationship attributes appears as code (e.g., in JSON format) to an LLM. In some embodiments, certain rules and conversion methods are used to convert the code into regular text. For example, in some embodiment, machine learning model 116 uses some rules or a template to convert the subgraph set into sentences. Because a triplet is a very logical representation, the triplet is synthesized into a sentence very logically. In other embodiments, machine learning model 116 provides a prompt template to a second LLM (e.g., LLM 118), wherein the prompt template instructs the LLM to translate triplets into continuous text data (e.g., text 214). For example, in various embodiments, machine learning model 116 restores text 214 from subgraph set 212 by inputting subgraph set 212 into LLM 118 that converts subgraph set 212 to text 214. In various embodiments, text 214 is obtained as reorganized text. In various embodiments, machine learning model 112 inputs the reorganized text and query 206 as part of another prompt template into LLM 216 to generate a response to query 206. Thus, in various embodiments, non-limiting process 200 converts text having text distances longer than a token length limitation of an LLM into logical distances in a knowledge graph, followed by reconverting some knowledge from the knowledge graph into continuous text after extracting the appropriate knowledge from the knowledge graph based on the logical distances by employing the continuous text to generate a correct response to a query.

In some embodiments, an improved multistage machine learning model is presented. For example, in an embodiment, each of blocks A-G illustrated in non-limiting process 200 correspond to individual processing stages of the multistage machine learning model, and each processing stage of the multistage machine learning model is executed by an individual machine learning model. For example, block A represents a pre-processing stage of the multistage machine learning model in which a first machine learning model truncates long text 202 to generate plurality of subtexts 204 (i.e., first data). Block B represent a second stage of the multistage machine learning model in which a second machine learning model ingests plurality of subtexts 204 to generate respective subgraphs (e.g., second data) from plurality of subtexts 204. Block C represents a third stage of the multistage machine learning model in which a third machine learning model combines the respective subgraphs into knowledge graph 210 (e.g., third data). Block D represent a fourth stage of the multistage machine learning model in which the second machine learning model or a fourth machine learning model generates query graph 208 (e.g., fourth data) from query 206. Block E represents a fifth stage of the multistage machine learning model in which a fifth machine learning model extracts subgraph set 212 (e.g., fifth data) from knowledge graph 210 by employing query graph 208. Block F represents a sixth stage of the multistage machine learning model in which a sixth machine learning model converts subgraph set 212 to text 214/continuous text (e.g., sixth data). Finally, block G represent a seventh stage of the multistage machine learning model in which a seventh machine learning model processes query 206 and text 214 to generate a response to query 206. In another embodiment, the multistage machine learning model includes one or more additional stages and/or machine learning models not mentioned herein.

Figure 3:
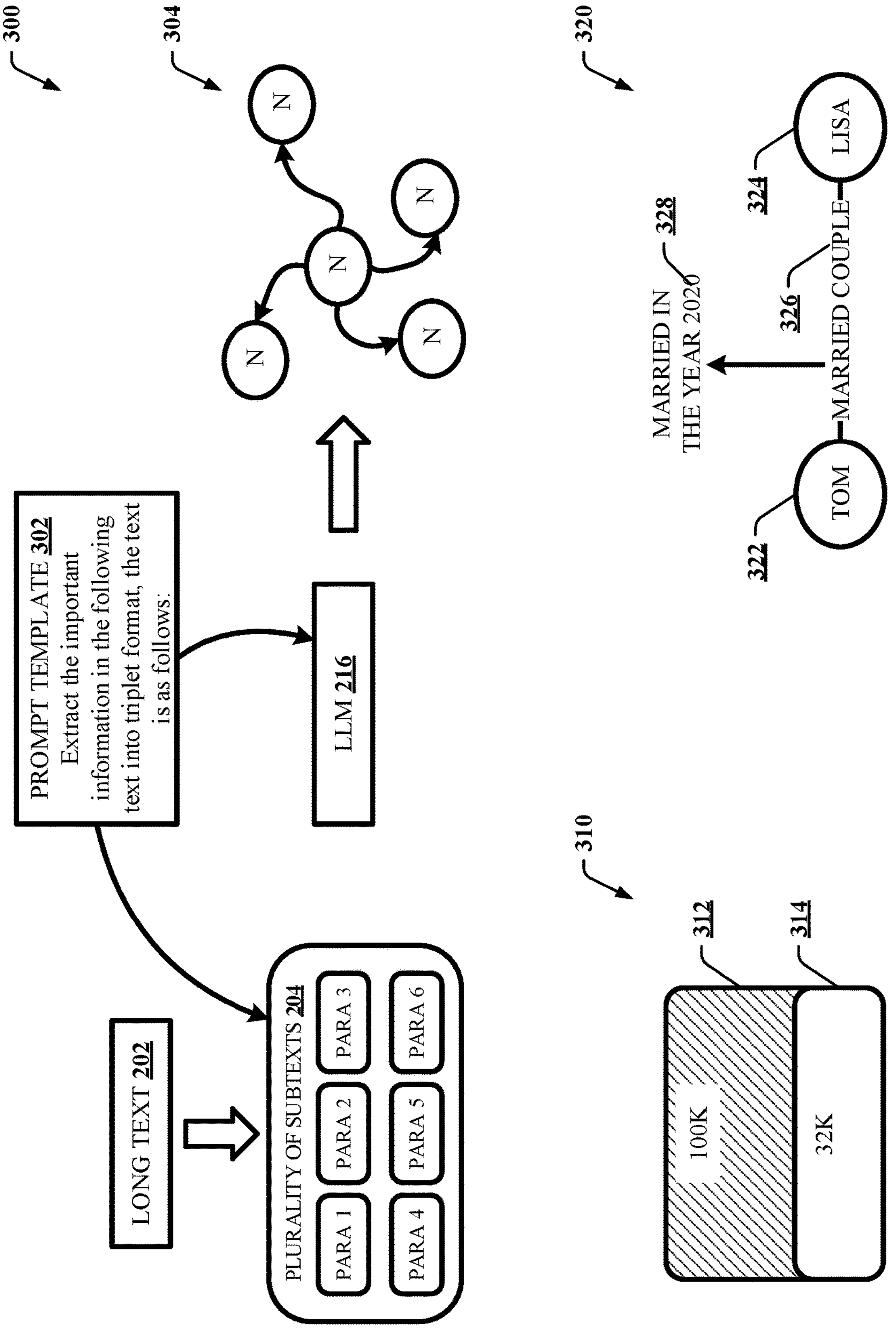
FIG. 3 illustrates a flow diagram of an example, non-limiting process of truncating text data into a plurality of subtexts and employing an LLM to generate respective triplets for the plurality of subtexts, and example, non-limiting representations of a context window and a triplet in accordance with one or more embodiments described herein.

FIG. 3 illustrates a flow diagram of an example, non-limiting process 300 of truncating text data into a plurality of subtexts and employing an LLM to generate respective triplets for the plurality of subtexts, and example, non-limiting representations of a context window and a triplet in accordance with one or more embodiments described herein. One or more embodiments described with respect to FIG. 3 are enabled by system 103 of FIG. 1. Repetitive description of like elements and/or processes employed in respective embodiments is omitted for sake of brevity.

With continued reference to FIGS. 1 and 2, non-limiting process 300 illustrates the usage of a prompt template to convert individual subtexts from plurality of subtexts 204 into respective logical subgraphs. As described elsewhere herein, a context window of an LLM limits the number of words that an LLM processes at any given time out of text input into the LLM, causing the LLM to automatically append or discard excess text outside the context window of the LLM. For example, as illustrated at 310, block 314 represents a context window of 32,000 words (32K) of an LLM and block 312 represents a context of 100,000 words (100K) that an entity (e.g., hardware, software, AI, a neural network, machine and/or a user) desires to input into an LLM to generate a response to a query (e.g., query 206) or multiple queries provided by the entity. The shaded portion of block 312 illustrates the amount of information that the LLM with the 32K context window automatically discards due to that information being in excess of 32,000 words.

In this regard, in various embodiments, long text 202 represents text data having a token length longer than a context window of LLM 216, and various embodiments herein truncate or split long text 202 into plurality of subtexts 204 as a pre-processing step, to allow LLM 216 to respond to a query, based on long text 202, without discarding useful information from long text 202. For example, in various embodiments, a semantic integrity-driven sliding window algorithm truncates or splits long text 202 into plurality of subtexts 204 before long text 202 is input into the LLM. In various embodiments, truncation of long text 202 allows the LLM to automatically extract logical information from long text 202 to generate knowledge graph 210 which is saved in memory as a memory map or virtual memory map. In various embodiments, generating knowledge graph 210 comprises converting each subtext from plurality of subtexts 204 into respective triplet graphs. For example, in various embodiments, LLM 216 is used to convert each subtext from plurality of subtexts 204 into respective logical subgraphs or triplet graphs, based on prompt template 302. In various embodiments, subgraph 304 is a subgraph generated from a subtext by LLM 216, wherein N represents a node of the subgraph. It is to be appreciated that the letter N shown in the subgraphs illustrated in the figures indicates a node of a subgraph.

In various embodiments, prompt template 302 is constructed and input (e.g., by a hardware, software, machine, AI or a human entity) into LLM 216. In various embodiments, the prompt template includes three parts, namely, instructions for LLM 216, a format corresponding to the instructions, and background information. The background information includes individual subtexts from plurality of subtexts 204, and the instructions inform the LLM to convert each subtext into respective subgraphs according to the format. For example, in various embodiments, prompt template 302 includes the instructions "Extract the useful information in the following text into triplet format, the text is as follows." In at least some embodiments, the format is defined by an entity (e.g., hardware, software, AI, a neural network, machine and/or a user) and ensures that each subtext has the same format when converted to a subgraph. In various embodiments, various types of instructions are used in a prompt template. In various embodiments, based on prompt template 302, LLM 216 processes each subtext into respective subgraphs (e.g., respective subgraphs 304).

A triplet refers to an [entity]-[relationship]-[entity] connection, wherein each node of a subgraph represents an entity of the corresponding subtext and an edge connecting two entities in the subgraph indicates the relationship between the two entities. A triplet also refers to an [entity]-[relationship]-[relationship attribute]-[entity] connection, wherein the relationship attribute is an attribute of the relationship between two entities in the subgraph. For example, consider that paragraph 5 (para 5) of plurality of subtexts 204 includes information about persons named Tom and Lisa, wherein Lisa and Tom are a married couple since the year 2020. In this case, a subgraph (e.g., subgraph 304) generated from paragraph 5 includes the [entity]-[relationship]-[relationship attribute]-[entity] connection illustrated at 320, where node 322 represents the entity Tom, node 324 represents the entity Lisa, relationship 326 between nodes 322 and 324 represents that Tom and Lisa are a married couple, and relationship attribute 328 of relationship 326 indicates that Tom and Lisa married in the year 2020. In various embodiments, the respective logical subgraphs (e.g., respective subgraphs 304) generated by LLM 216 are combined into knowledge graph 210 by machine learning model 108.

Figure 4:
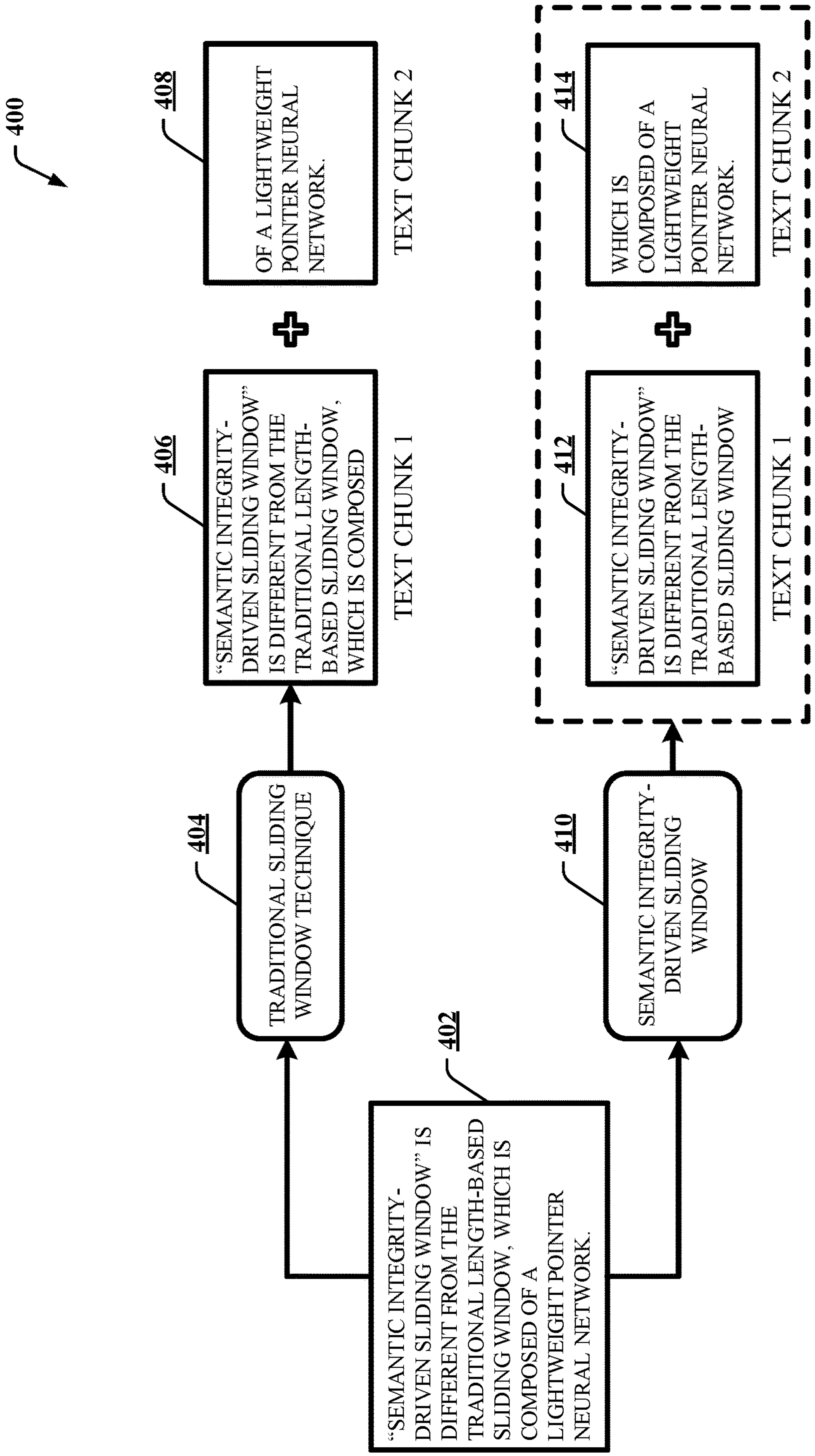
FIG. 4 illustrates a flow diagram of an example, non-limiting truncation of text data into a plurality of subtexts by employing a semantic integrity-driven sliding window in accordance with one or more embodiments described herein.

FIG. 4 illustrates a flow diagram of an example, non-limiting truncation 400 of text data into a plurality of subtexts employing a semantic integrity-driven sliding window in accordance with one or more embodiments described herein. One or more embodiments described with respect to FIG. 4 are enabled by system 103 of FIG. 1. Repetitive description of like elements and/or processes employed in respective embodiments is omitted for sake of brevity.

With continued reference to FIGS. 1 and 2, non-limiting truncation 400 illustrates a difference between truncating text data by employing a semantic integrity-driven sliding window versus a traditional sliding window technique. For example, in various embodiments, a semantic integrity-driven sliding window (or sliding window driven by semantic integrity), which is an algorithm composed of a lightweight pointer neural network, is employed to truncate long text 202 into plurality of subtexts 204, wherein long text 202 has a token length longer than the context window of LLM 216. In various embodiments, such truncation allows LLM 216 to process long text 202, without discarding any portion of the information contained in long text 202.

In various embodiments, the semantic integrity-driven sliding window preserves semantic integrity of long text 202 during truncation of long text 202. For example, in various embodiments, an input to the lightweight pointer neural network is sequence data, and an output of the lightweight pointer neural network is a probability value that indicates whether semantic integrity of long text 202 is preserved during truncation of long text 202 into plurality of subtexts 204. That is, in various embodiments, the probability value indicates whether the text in plurality of subtexts 204 has semantic integrity. Stated differently, the probability value determines whether the sliding window destroys the semantic integrity of continuous text from long text 202 when truncating long text 202. Further, in various embodiments, the lightweight pointer neural network ensures that subtexts or text chunks of plurality of subtexts 204 are semantically independent from one another and that each subtext includes information about only one subject.

In this regard, the semantic integrity-driven sliding window is different from a traditional length-based sliding window. For example, in FIG. 4, the sentence "Semantic integrity-driven sliding window' is different from the traditional length-based sliding window, which is composed of a lightweight pointer neural network," illustrated at 402, is split, at 404, by a traditional sliding window technique into text chunks 406 and 408, and at 410, by a semantic-integrity driven sliding window into text chunks 412 and 414. It is evident from FIG. 4 that the combination of text chunks 412 and 414 has greater semantic integrity than the combination of text chunks 406 and 408. For example, text chunk 406 appears to be truncated after the word "composed," which causes text chunk 408 to have less meaning by itself. Additional aspects of the lightweight pointer neural network are described in greater detail with reference to FIG. 5.

Figure 5:
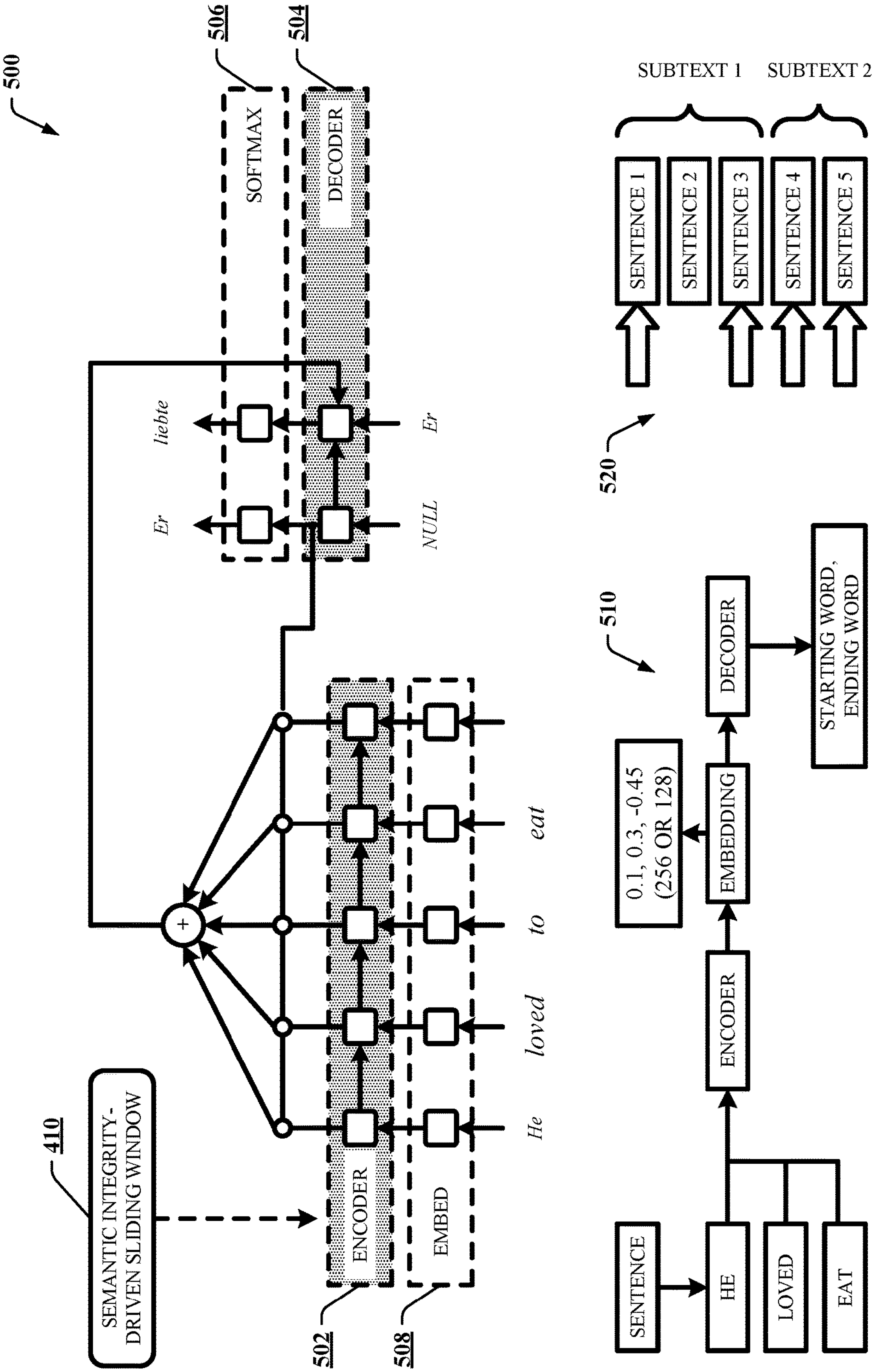
FIG. 5 illustrates a block diagram of an example, non-limiting mechanism employed by a semantic integrity-driven sliding window, and example, non-limiting representations showing how the semantic integrity-driven sliding window truncates text data in accordance with one or more embodiments described herein.

FIG. 5 illustrates a block diagram of an example, non-limiting mechanism 500 employed by a semantic integrity-driven sliding window, and example, non-limiting representations 510 and 520 showing how the semantic integrity-driven sliding window truncates text data in accordance with one or more embodiments described herein. One or more embodiments described with respect to FIG. 5 are enabled by system 103 of FIG. 1. Repetitive description of like elements and/or processes employed in respective embodiments is omitted for sake of brevity.

With continued reference to at least FIG. 4, in various embodiments, the lightweight pointer neural network splits each sentence of long text 202 into individual tokens, to truncate long text 202 into plurality of subtexts 204. For example, in an embodiment, the lightweight pointer neural network splits the sentence "He loved to eat" into individual words "he," "loved," "to," and "eat." At 508, the individual words are input into an embedding layer of the lightweight pointer neural network to embed the individual words. These embeddings are input into an encoder. At 502, the encoder generates an output for the individual words, wherein the output is also called an embedding, which in one embodiment is a series number. The embedding is a digital representation of the sentence and/or a word of the sentence. For example, in various embodiments, for each word input into the encoder, the encoder generates a numerical value (e.g., 0.1, 0.3, etc.) that represents an embedding for the word. The embeddings generated by the encoder are multi-dimensional, e.g., are 128-dimensional embeddings or 256-dimensional embeddings.

At 504, by employing the embeddings generated by the encoder, a decoder of the lightweight neural network generates another token series, such as a series number. The token series number is not limited to specific values, but a softmax layer is implemented, at 506, to reduce the scope of the token series number between zero (0) and one (1). Based on the token series, the decoder of the lightweight pointer neural network generates a start word and an end word of a paragraph to form a subtext. This process is further illustrated via non-limiting representations 510 and 520. For example, in an embodiment, the decoder marks respective start words and end words in individual sentences of a paragraph of long text 202 having five sentences, to indicate which sentences are to be combined into a single subtext. For example, the decoder marks the first word of sentence 1 of the paragraph as the start word (as illustrated by the arrow at sentence 1 at 520) and the last word of the third sentence of the paragraph as the end word (as illustrated by the arrow at sentence 3 at 520) of a subtext, indicating that the first three sentences of the paragraph are to be combined into one subtext. Similarly, the decoder marks the first word of the fourth sentence of the paragraph as the start word (as illustrated by the arrow at sentence 4 at 520) and the last word of the fifth sentence of the paragraph as the end word (as illustrated by the arrow at sentence 5 at 520) of a subtext, indicating that the fourth and fifth sentences of the paragraph are to be combined into another subtext. Thus, in various embodiments, the decoder splits the paragraph from the text data into a subtext having three sentences and another subtext having two sentences. As such, in various embodiments, the lightweight pointer neural network splits long text 202 into plurality of subtexts 204.

In various embodiments, the use of a task attention mechanism and a virtual memory graph in combination with the semantic integrity-driven sliding window and processing of exceptionally long text data into triplets has the advantage of transforming text-based limitations into logical distances within a graph and efficient reasoning by LLMs. Doing so has further advantages in terms of circumventing a token length of an LLM such that semantic integrity of information analyzed by LLMs to respond to queries is preserved throughout the overall process.

Figure 6:
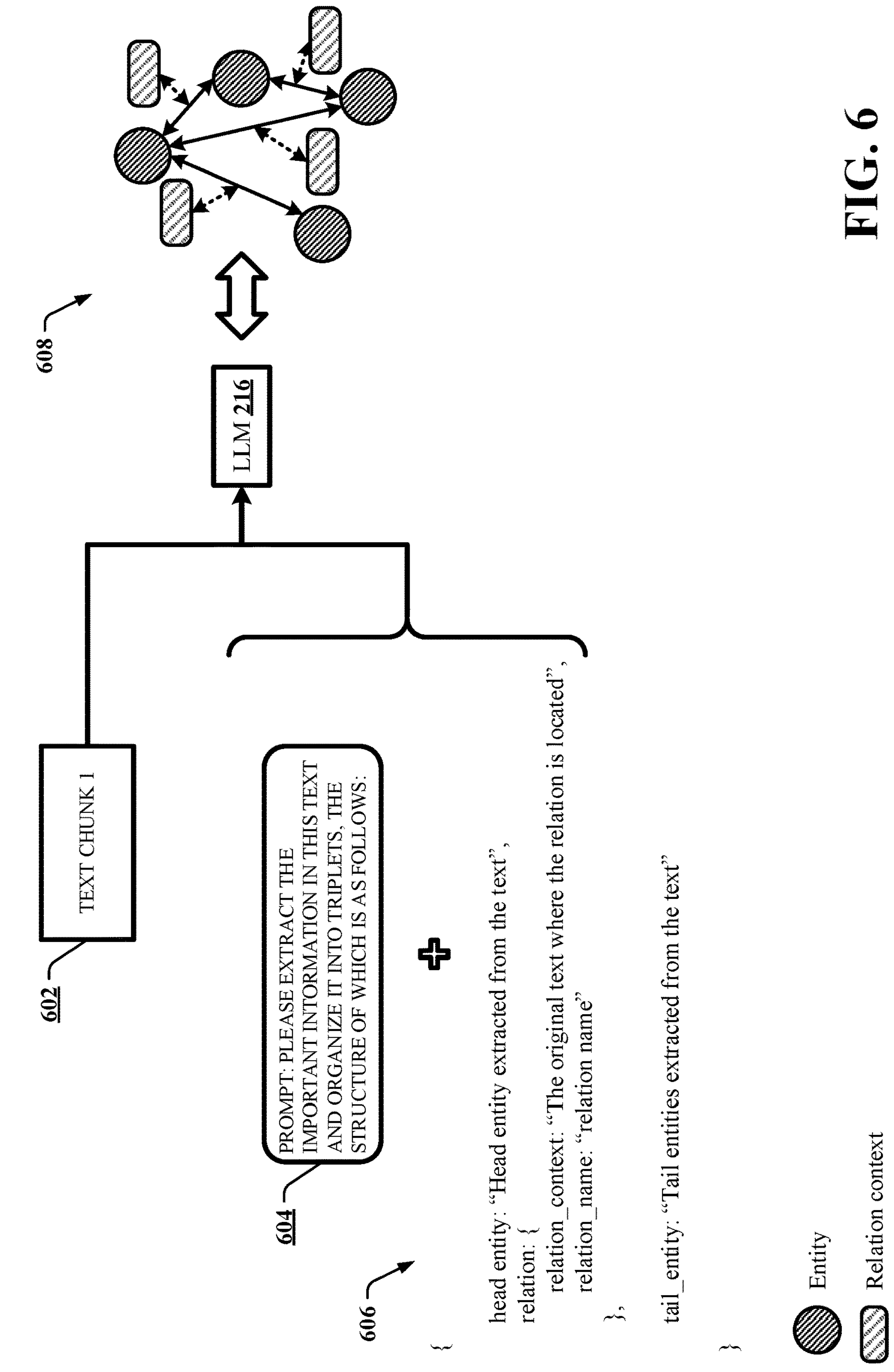
FIG. 6 illustrates a flow diagram of an example, non-limiting process of employing an LLM and a prompt template to generate a triplet from a subtext derived by truncating text data in accordance with one or more embodiments described herein.

FIG. 6 illustrates a flow diagram of an example, non-limiting process 600 of employing an LLM and a prompt template to generate a triplet from a subtext derived by truncating text data in accordance with one or more embodiments described herein. One or more embodiments described with respect to FIG. 6 are enabled by system 103 of FIG. 1. Repetitive description of like elements and/or processes employed in respective embodiments is omitted for sake of brevity.

With continued reference to FIGS. 1 and 2, FIG. 6 illustrates an example of a prompt template (e.g., prompt template 302) that, in some embodiments, is input into an LLM, such as LLM 216, to generate a subgraph in a triplet format. For example, in various embodiments, a prompt template includes a text chunk 602, wherein the text chunk is derived from long text 202. This text chunk 602 is also understood to be a subtext. In various embodiments, the prompt template further includes instructions or prompt 604 that instruct LLM 216 to extract useful information from the text chunk and organize the useful information into triplets to form a subgraph. In various embodiments, the prompt template further includes format 606 that defines the structure of the subgraph that LLM 216 is to generate. In various embodiments, based on the prompt template, LLM 216 generates subgraph 608 comprising entities, relationships and relation contexts, as described by the legend at the bottom left portion of FIG. 6.

Figure 7:
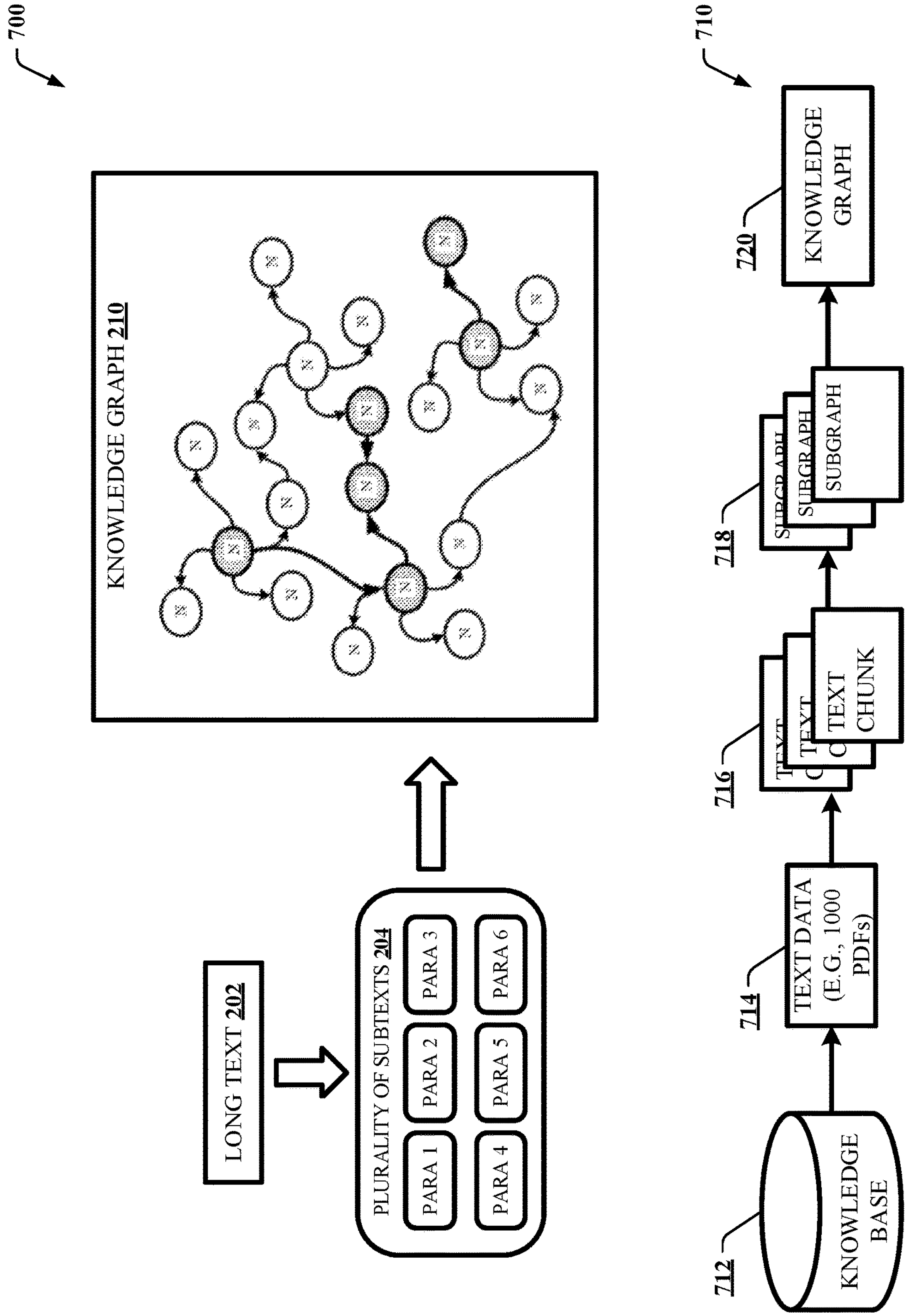
FIG. 7 illustrates flow diagrams of example, non-limiting processes to generate a virtual knowledge graph from text data in accordance with one or more embodiments described herein.

FIG. 7 illustrates flow diagrams of example, non-limiting processes 700 and 710 that generate a virtual knowledge graph from text data in accordance with one or more embodiments described herein. One or more embodiments described with respect to FIG. 7 are enabled by system 103 of FIG. 1. Repetitive description of like elements and/or processes employed in respective embodiments is omitted for sake of brevity.

In various embodiments, a virtual map corresponding to text data having a token length greater than a threshold token length of a machine learning model is generated upon inputting the text data into the machine learning model, after truncating the text data into text chunks having respective token lengths smaller than the threshold token length of the machine learning model. In some embodiments, the machine learning model is an LLM (e.g., LLM 110, LLM 216, etc.). In various embodiments, the virtual graph is used to solve a token length limitation of machine learning models during model reasoning. For example, in various embodiments, a large knowledge base having a token length greater than a context window of a machine learning model is converted into a virtual knowledge graph that is used by the machine learning model to scan useful information from the knowledge base, without appending information exceeding the context window of the machine learning model. As a result, in various embodiments, a context is organized into a knowledge graph with triplets, and a query is converted into a query graph to extract a subgraph set from the knowledge graph. In various embodiments, the subgraph set is converted back to continuous text by inputting the subgraph set into another machine learning model that reorganizes entities and relationships in the subgraph set into a continuous piece of text. In various embodiments, the restored text is input into the original machine learning model or another machine learning model along with the query to generate a response to the query.

In various embodiments, knowledge graph 210 is generated from long text 202, wherein long text 202 represents a knowledge base having a token length greater than a context window/threshold token length of a machine learning model. In an embodiment, the machine learning model is an LLM (e.g., LLM 110, LLM 216, another LLM). A context window of a machine learning model is defined as the maximum number of words that are accepted by the machine learning model at any given time for a task. One usage of machine learning models is in retrieval augmented generation (RAG), wherein a machine learning model accesses a knowledge base, outside of training data provided to the machine learning model, before generating a response to a query, and such a knowledge base is provided to the machine learning model as a context that is input to the machine learning model by an entity (e.g., hardware, software, AI, a neural network, machine and/or a user) employing the machine learning model. The context window exists as a limitation inside the machine learning model, wherein the machine learning model computes a token size/length (i.e., number of words, token count, etc.) of information input to the machine learning model as context, and if the token size/length is greater than the context window of the machine learning model, the machine learning model discards excess text from the information input to the machine learning model. Thus, a knowledge base comprised of big data or having, for example, 100 or 10,000 passages of information or content, needs to be handled by an entity in parts to prevent the machine learning model from abandoning the excess content. In other words, some part of a context or information input to a machine learning model is appended or forgotten by the machine learning model if the context of the information is greater than the context window of the machine learning model. In various embodiments, knowledge graph 210 is generated from long text 202 and made accessible to the machine learning model or another machine learning model to generate a response to a query. In various embodiments, generating knowledge graph 210 increases the context length of a machine learning model.

In various embodiments, generating knowledge graph 210 comprises truncating long text 202 into plurality of subtexts 204 having respective token lengths smaller than the context window of the machine learning model. In various embodiments, long text 202 is truncated when long text 202 is being ingested by the system (e.g., system 103). For example, in various embodiments, a semantic integrity-driven sliding window, which is an algorithm composed of a lightweight pointer neural network, truncates long text 202 into plurality of subtexts 204. In various embodiments, truncation of long text 202 allows logical information to be automatically extracted from long text 202 to generate knowledge graph 210. In various embodiments, knowledge graph 210 is saved in memory as a memory map. In various embodiments, the sliding window approach ensures semantic coherence of data, thereby enhancing information extraction. In various embodiments, knowledge graph 210 (e.g., a virtual knowledge graph) optimizes reasoning efficiency, addressing the context window limitation of a machine learning model and providing a more effective method to handle extensive linguistic content. Overall, such features of the various embodiments disclosed herein contribute to improved performance and versatility of machine learning models in handling complex language processing/understanding tasks.

In various embodiments, generating knowledge graph 210 comprises converting each subtext from plurality of subtexts 204 into respective triplet graphs. For example, in various embodiments, the machine learning model converts each subtext from plurality of subtexts 204 into respective logical subgraphs or triplet graphs, based on a prompt template. In various embodiments, the respective logical subgraphs (e.g., respective subgraphs 304) generated by machine learning model are combined into knowledge graph 210. For example, in various embodiments, an algorithm is used to combine the respective logical subgraphs into knowledge graph 210 based on semantic similarity of nodes in the respective logical subgraphs, e.g., as determined by a cosine similarity measurement between embeddings representing the nodes. For example, in various embodiments, a common node representing a common entity (e.g., sparrow) in two different subgraphs becomes a point of connection for the subgraphs.

In various embodiments, training a machine learning model to convert a plurality of subtexts into respective subgraphs that are combined into a knowledge graph involves several steps and considerations. For example, in various embodiments, generating training data to train the machine learning model comprises data collection and processing, wherein a diverse dataset of subtexts and corresponding graphs that represent the information in the subtexts are collected. Such a dataset comprises a wide range of topics and formats. In various embodiments, the dataset is preprocessed by tokenizing the subtexts and representing the graphs in a suitable format, such as adjacency matrices or node-edge lists. Thereafter, a suitable machine learning model architecture is chosen for the task. In some embodiments, graph neural networks (GNNs) are effective for tasks involving graph structures. In other embodiments, transformer-based architectures are also adapted for this purpose. In various embodiments, the machine learning model is designed to ingest subtexts as inputs and output a set of graphs that capture the relevant information. Next, a training objective that encourages the machine learning model to generate graphs that accurately represent the information in the subtexts is defined. In various embodiments, defining the training objective involves defining a loss function that penalizes differences between predicted and ground truth graphs.

In various embodiments, a training process for the machine learning model comprises employing the prepared dataset and training the machine learning model to map subtexts to graphs by adjusting model parameters during the training process. In various embodiments, techniques such as transfer learning, or pre-training on a related task if a large labeled dataset is not available for a specific task at hand, is employed for the training process. Once trained, the machine learning model is evaluated on a validation set to ensure that the machine learning model is generalizing well to new data. Thereafter, hyperparameters and the model architecture are adjusted according to need. Further, in various embodiments, the machine learning model is fine-tuned based on feedback from the evaluation process to improve performance of the machine learning model.

In various embodiments, to train a machine learning model to combine subgraphs into a large knowledge graph (e.g., knowledge graph 210), a mechanism to combine subgraphs into a coherent knowledge graph is developed by identifying common nodes or edges between subgraphs and establishing relationships. Additionally, a post-processing step is implemented to refine the combined knowledge graph and ensure consistency. Finally, iterative improvement is employed by iterating the training based on the machine learning model trained to combine the subgraphs into the coherent knowledge graph and a training process employed for the machine learning model based on performance and feedback. In various embodiments, the iterative process involves collecting additional labeled data, refining the model architecture, or experimenting with different training strategies. In various embodiments, the process of training a machine learning model to convert subtexts into subgraphs or combining subgraphs into a coherent knowledge graph involves maintaining a balance between model complexity and interpretability, and regularly validating a model's performance on diverse and representative datasets. In general, the success of a model relies on the quality and diversity of training data, as well as a design of the model architecture and training process.

The process of generating knowledge graph 210 in various embodiments is further illustrated at 710, wherein a knowledge base 712 comprising text data 714 having a token length longer than the context window of a machine learning model is split into text chunks 716 (also referred to as subtexts), wherein text chunks 716 have respective token lengths smaller than the context window of the machine learning model, and wherein text chunks 716 are semantically independent from one another. Thereafter, in various embodiments, text chunks 716 are accessed by the machine learning model, and the machine learning model converts text chunks 716 into respective triplet graphs or subgraphs 718. In various embodiments, the subgraphs 718 are combined into a single graph that is knowledge graph 720 (or knowledge graph 210). In various embodiments, knowledge graph 210 is used in a task attention mechanism to extract from knowledge graph 210, a subgraph set that is isomorphic to a query graph generated by the machine learning model from a query. In various embodiments, the query graph is a triplet graph. In various embodiments, continuous text data is extracted from the subgraph set by another machine learning model and the continuous text data along with the query is fed to the previous machine learning model to generate a response to the query, as described in greater detail with respect to FIG. 8.

Figure 8:
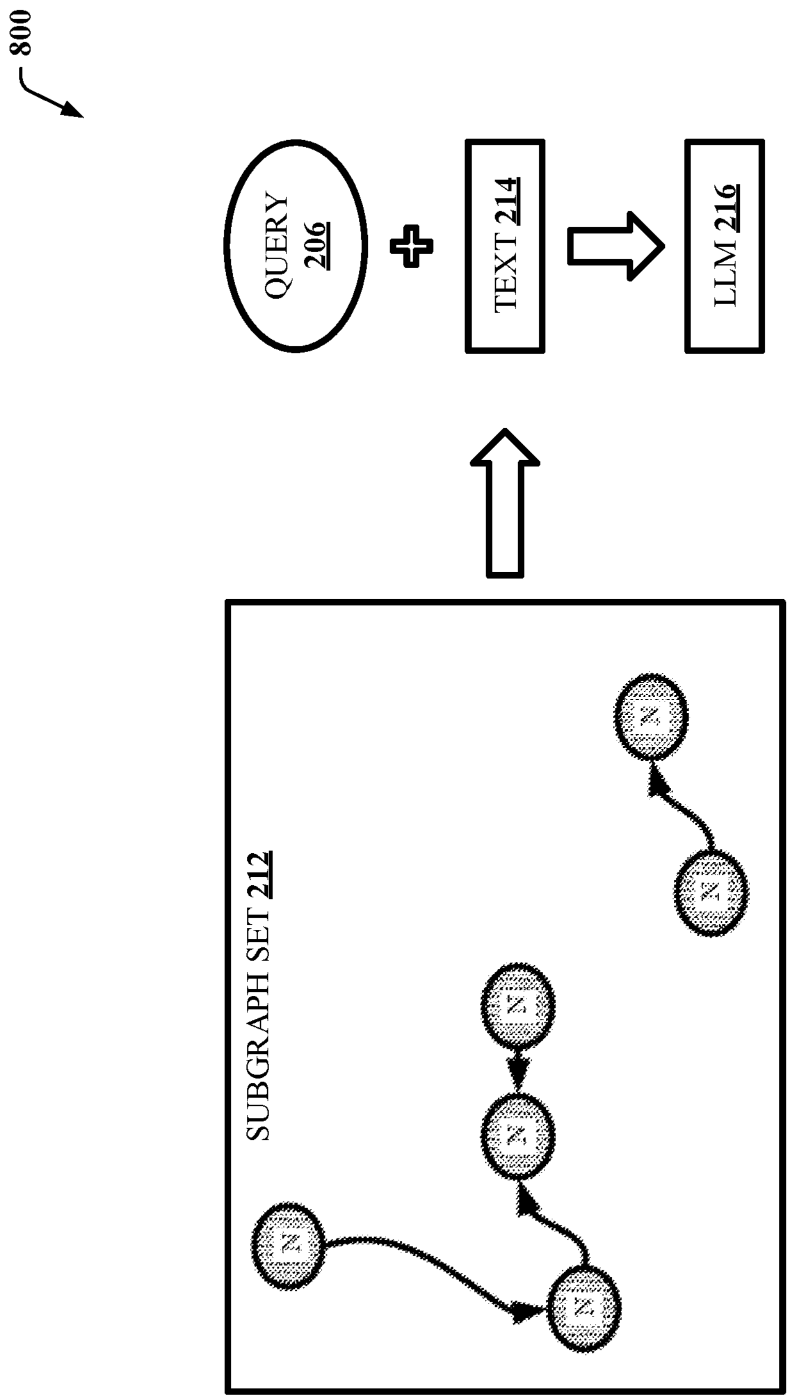
FIG. 8 illustrates a flow diagram of an example, non-limiting process of employing a subgraph set extracted from a virtual knowledge graph to generate a response to a query provided to an LLM in accordance with one or more embodiments described herein.

FIG. 8 illustrates a flow diagram of an example, non-limiting process 800 of employing a subgraph set extracted from a virtual knowledge graph to generate a response to a query provided to an LLM in accordance with one or more embodiments described herein. One or more embodiments described with respect to FIG. 8 are enabled by system 103 of FIG. 1. Repetitive description of like elements and/or processes employed in respective embodiments is omitted for sake of brevity.

Continuing from FIG. 7, FIG. 8 illustrates subgraph set 212 that, in various embodiments, is extracted (e.g., by machine learning model 114) from knowledge graph 210 through a task attention mechanism, wherein subgraph set 212 is isomorphic to a query graph (e.g., query graph 208) generated from a query (e.g., query 206). For example, as described in one or more embodiments, a prompt template is used to generate a question virtual graph or query graph for an entity's question or query. In various embodiments, the entity is a hardware, software, AI, a neural network, machine and/or a user. In various embodiments, the query graph is a subgraph of the entity's query, and the query graph is generated by employing the same prompt template as the prompt template used to generate knowledge graph 210. In various embodiments, after obtaining the query graph, machine learning model 114 uses the query graph to perform graph structure matching on knowledge graph 210 constructed from long text 202 by employing subgraph isomorphism, and to extract subgraph set 212 such that subgraph set 212 is isomorphic to the query graph.

In various embodiments, after extraction of subgraph set 212, continuous text (e.g., text 214) is restored from subgraph set 212. This is achieved via various methods. For example, in various embodiments, subgraph set 212 with entities, relations, and relationship attributes appears as code (e.g., in JSON format) to a machine learning model. In some embodiments, by employing certain rules and conversion methods, the code is converted into regular text by machine learning model 116. For example, in some embodiments, machine learning model 116 uses some rules or a template to convert the subgraph set into sentences. Because a triplet is a very logical representation, the triplet is synthesized into a sentence very logically. In other embodiments, a prompt template is provided to another machine learning model, wherein the prompt template instructs the machine learning model to translate triplets into continuous text data. For example, in various embodiments, machine learning model 116 inputs subgraph set 212 into LLM 118 that converts subgraph set 212 to text 214. In various embodiments, text 214 is obtained as reorganized text. In various embodiments, machine learning model 112 inputs the reorganized text and the query as part of another prompt template into a machine learning model (e.g., LLM 110, LLM 216, another machine learning model) to generate a response to the query.

In various embodiments, knowledge graph 210 is stored in computer memory, to serve as a logical index of knowledge comprised in long text 202 to generate a response to the query. In an embodiment, knowledge graph 210 is a virtual graph or a virtual knowledge graph that is stored in memory for fast access. In another embodiment, knowledge graph 210 is cached on a disk as accumulated knowledge. In various embodiments, to parse long text 202, the process of generating triplet graphs or subgraphs from plurality of subtexts 204 adds additional time complexity to the overall process. However, in various embodiments, upon generating knowledge graph 210 and combining knowledge graph 210 with a machine learning model to perform reasoning, the time duration to perform the reasoning is greatly reduced. Thus, in various embodiments, the increase in time consumed by the overall process is minimal from a long-term perspective/over a longer time period. Upon testing, the extra storage space occupied by generating the triplets was not found to be very large, which was about 2-3 times that of the original long text. In at least some embodiments, the memory space occupied after establishment is about 20 MB-30 MB.

In various embodiments, a long-term memory of the machine learning model is stored as a task attention mechanism and a virtual memory map (e.g., knowledge graph 210). A task attention mechanism is a specialized or adapted version of a conventional attention mechanism and is specifically designed to handle a certain task or a set of related tasks. The main difference between task attention mechanisms and regular attention mechanisms is that the former are tailored to the requirements of a specific problem, potentially considering task-specific features or constraints to improve the performance and efficiency of target tasks. In this regard, the task attention mechanism amplifies, for the machine learning model, content that is closely related to the task. In various embodiments, storing the long-term memory of the machine learning model as a task attention mechanism implies causing the machine learning model to focus on a task and not on the context. For example, in one or more embodiments, storing the long-term memory (or long-term logical memory) of the machine learning model as the task attention mechanism indicates that the machine learning model employs the long-term memory as a mechanism to focus on and process specific information relevant to the task to work on the task. In various embodiments, the task attention mechanism assists the machine learning model to focus more effectively on parts of data input to the machine learning model that are relevant to a specific task when processing large amounts of input data. In this case, storing the long-term memory of the machine learning model as a task attention mechanism improves efficiency and accuracy when processing queries, thereby generating more relevant and accurate responses for users. The memory of a machine learning model is defined as the text that the machine learning model remembers. For example, based on a long dialogue run by an LLM, the LLM is expected to recognize a next step or dialogue or a next-to-next step or dialogue, and so on in a subsequent interaction, based on the LLM's memory of the long dialogue in the previous interaction. The memory of the machine learning model, which is the text window that the machine learning model remembers or recognizes, is similar to the context window of the machine learning model. In this regard, the long-term memory of the machine learning model refers to a context window of more than 4000 words (4K).

By converting text data having a token length greater than a context window of a machine learning model into a logical graph, various embodiments herein aim to increase the context window of the machine learning model. For example, various embodiments herein aim for the machine learning model to remember very long-term information, such as to remember the beginning of a book after the machine learning model has finished processing information from the book (i.e., reading the entire book). Further, the various embodiments herein target a task driven long-term memory to cause the machine learning model to focus on a task, but not the context itself. In other words, in various embodiments, the machine learning model learns to organize information by the task. For example, in an embodiment, the machine learning model is queried about various subjects. At the beginning of the interaction, the machine learning model is queried about weather, towards the middle of the interaction, the machine learning model is queried about an industry, and towards the end of the interaction, the machine learning model is queried about a specific technology. In various embodiments, despite the information from the interaction being mixed in dialogues, a task driven long-term memory allows the machine learning model to organize the dialogues or chat history in a context, by a task or topic, and not by a sequence of the interactions. As stated elsewhere herein, in an embodiment, the machine learning model is an LLM.

Figure 9A:
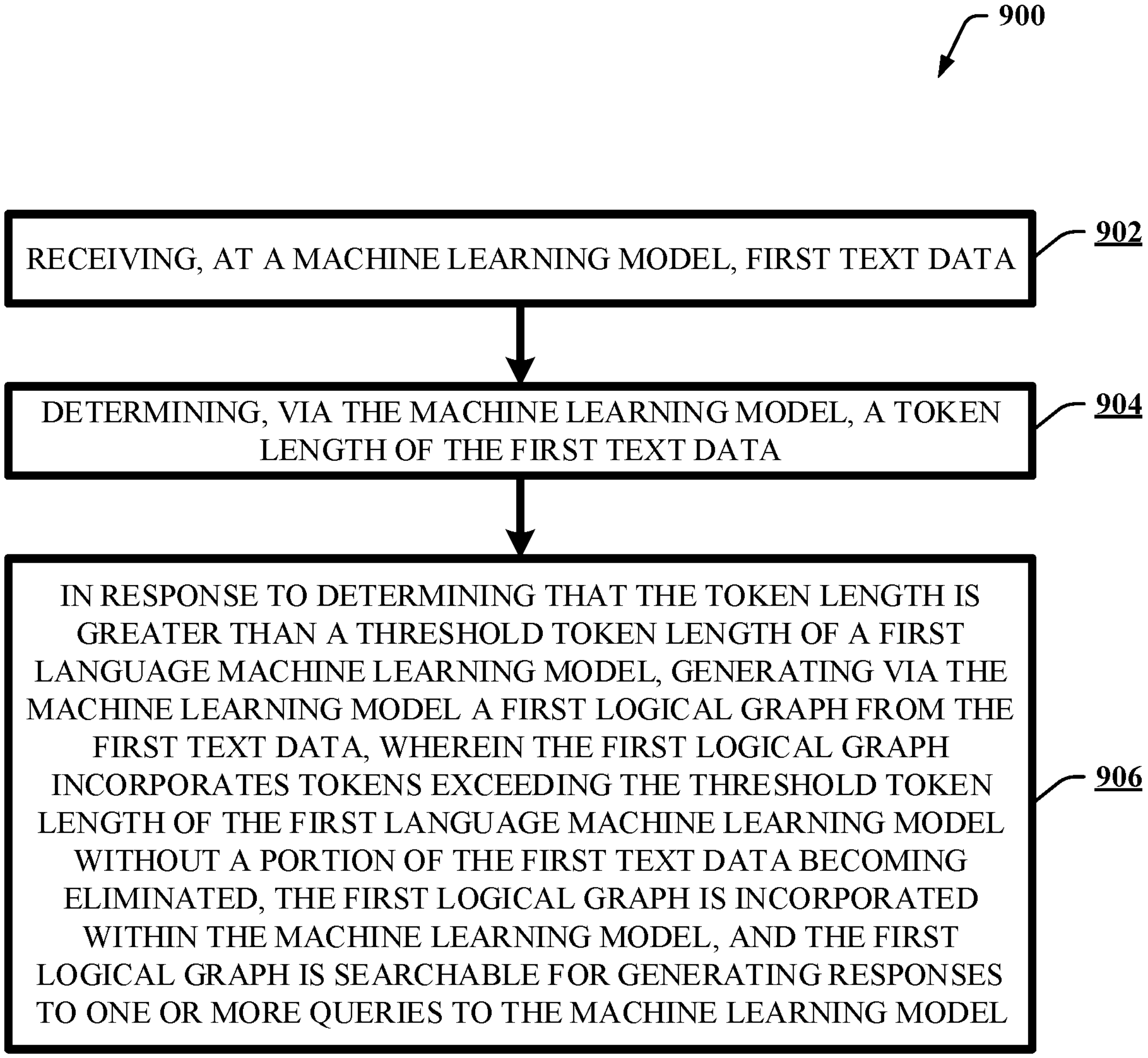
FIG. 9A illustrates a flow diagram of an example, non-limiting method that generates a logical graph from text data provided to a machine learning model in accordance with one or more embodiments described herein.
Figure 9B:
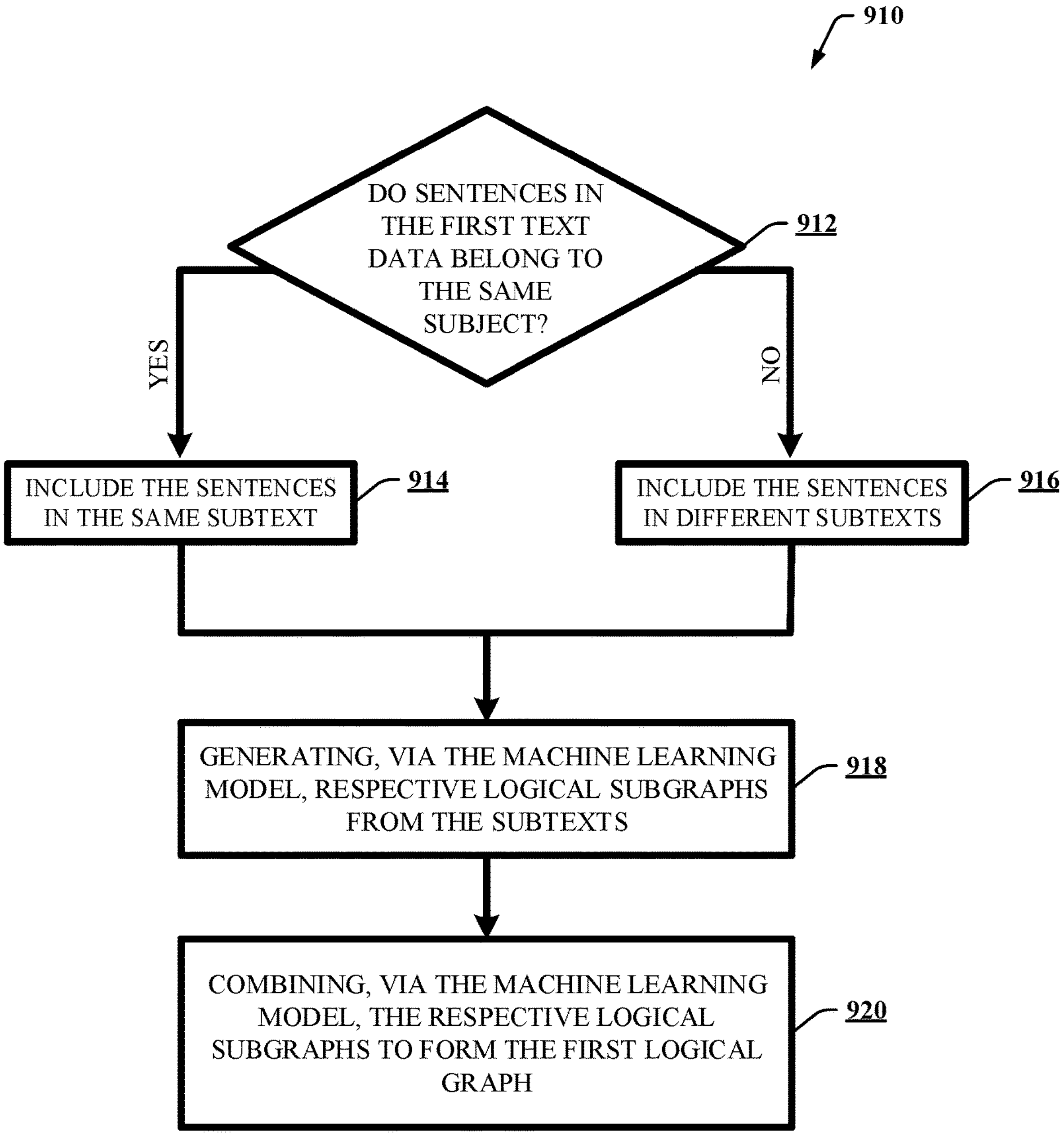
FIG. 9B illustrates another flow diagram of an example, non-limiting method that generates a logical graph from text data provided to a machine learning model in accordance with one or more embodiments described herein.

FIG. 9A illustrates a flow diagram of an example, non-limiting method 900 that generates a logical graph from text data provided to a machine learning model in accordance with one or more embodiments described herein. FIG. 9B illustrates another flow diagram of an example, non-limiting method 910 that generates a logical graph from text data provided to a machine learning model in accordance with one or more embodiments described herein. One or more embodiments described with respect to FIGS. 9A and 9B are enabled by system 103 of FIG. 1. Repetitive description of like elements and/or processes employed in respective embodiments is omitted for sake of brevity.

At 902, the non-limiting method 900 comprises receiving, at a machine learning model, first text data.

At 904, the non-limiting method 900 comprises determining, via the machine learning model, a token length of the first text data.

At 906, the non-limiting method 900 comprises in response to determining that the token length is greater than a threshold token length of a first language machine learning model, generating via the machine learning model a first logical graph from the first text data, wherein the first logical graph incorporates tokens exceeding the threshold token length of the first language machine learning model without a portion of the first text data becoming eliminated, the first logical graph is incorporated within the machine learning model, and the first logical graph is searchable for generating responses to one or more queries to the machine learning model.

In various embodiments, generating the first logical graph at 906 further comprises generating, via the machine learning model, subtexts from the portion of the first text data that exceeds the threshold token length of the first language machine learning model, as further illustrated by non-limiting method 910.

At 912, the non-limiting method 910 comprises determining whether sentences in the first text data belong to the same subject to ensure that semantic integrity of the text data is preserved during the generating of the first logical graph.

If yes, then at 914, the non-limiting method 910 comprises including the sentences in the same subtext. If not, then at 916, the non-limiting method 910 comprises including the sentences in different subtexts to ensure that sentences having like meaning are included in the same subtext.

At 918, the non-limiting method 900 comprises generating, via the machine learning model, respective logical subgraphs from the subtexts.

At 920, the non-limiting method 900 comprises combining, via the machine learning model, the respective logical subgraphs to form the first logical graph.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. Additionally, the computer-implemented methodologies described hereinafter and throughout this specification are capable of being stored on an article of manufacture to enable transporting and transferring the computer-implemented methodologies to computers. The term article of manufacture, as used herein, is intended to encompass a computer program accessible from any computer-readable device or storage media.

One or more embodiments described herein employ hardware and/or software to solve problems that are highly technical, that are not abstract, and that cannot be performed as a set of mental acts by a human. For example, a human, or even thousands of humans, cannot efficiently, accurately and/or effectively convert a large knowledge base having a token length greater than the token length of an LLM into a logical graph that is queried by the LLM as the one or more embodiments described herein enable this process. The human mind and/or a human with pen and paper also cannot employ a task attention mechanism to extract a subgraph set from the logical graph based on a query, to generate a response to the query, as conducted by one or more embodiments described herein.

Embodiments of the present disclosure store the long-term memory of an LLM in the form of a task attention mechanism and a virtual graph or virtual memory map to circumvent the problem of a maximum token limit of an LLM. In various embodiments, a method of processing ultra-long text into entity A+relationship+relationship attribute+entity B is also stored in memory. In various embodiments, storing the long-term memory of the first LLM as a task attention mechanism and a virtual memory map implies causing the LLM to focus on a task and not on the context itself. The memory of an LLM is the text that the LLM remembers. For example, based on a long dialogue run by an LLM, the LLM is expected to recognize a next step or dialogue or a next-to-next step or dialogue, and so on in a subsequent interaction, based on the LLM's memory of the long dialogue in the previous interaction. The memory of the LLM, which is the text window that the LLM remembers or recognizes, is very similar to the context window of the LLM. In this regard, the long-term memory of the LLM refers to a context window of more than 4000 words (4K). In various embodiments, when an entity (e.g., hardware, software, AI, a neural network, machine and/or a user) needs to use information in an ultra-long text for complex tasks, a virtual graph stored in memory and generated from the ultra-long text is utilized to match information in a query or a problem with information in the virtual graph by employing the task attention mechanism. In various embodiments, a sub-graph that is closest to the problem is extracted from the virtual graph and used to restore semantics and logic of the problem to be solved. As such, in various embodiments, text comprised in a knowledge base or documents from a knowledge base (e.g., the ultra-long text) that are semantically closest to a problem to be solved, combined with questions that make up the problem, are used to complete a task.

Embodiments of the present disclosure provide a number of advantages, including increasing the context window of an LLM, improving processing efficiency of an LLM to extract a response to a query from a large knowledge base and reducing an amount of time needed by an LLM to respond to a query. Embodiments of the present disclosure also provide advantages in terms of ensuring a more effective and accurate utilization of LLMs in handling complex tasks, even when dealing with extended contexts, and improving the efficiency and effectiveness of entity interactions and responses within various applications that rely on LLMs. For example, in various embodiments, the use of a task attention mechanism and a virtual memory graph/dynamic memory graph in combination with processing of exceptionally long text data into semantic triplets has the advantage of transforming text-based limitations into logical distances within a graph and efficient reasoning by LLMs despite token length limitations of the LLMs. In various embodiments, creating the virtual memory graph based on a long text input and employing joint reasoning by further employing a combination of the virtual memory graph and an LLM have the advantage of providing more effective reasoning by utilizing LLMs and generating accurate answers for complex tasks involving super-long texts. Additionally, in various embodiments, employing a sliding window driven by semantic integrity to extract logical information from exceptionally long texts allows efficient handling of extensive textual information.

Figure 10:
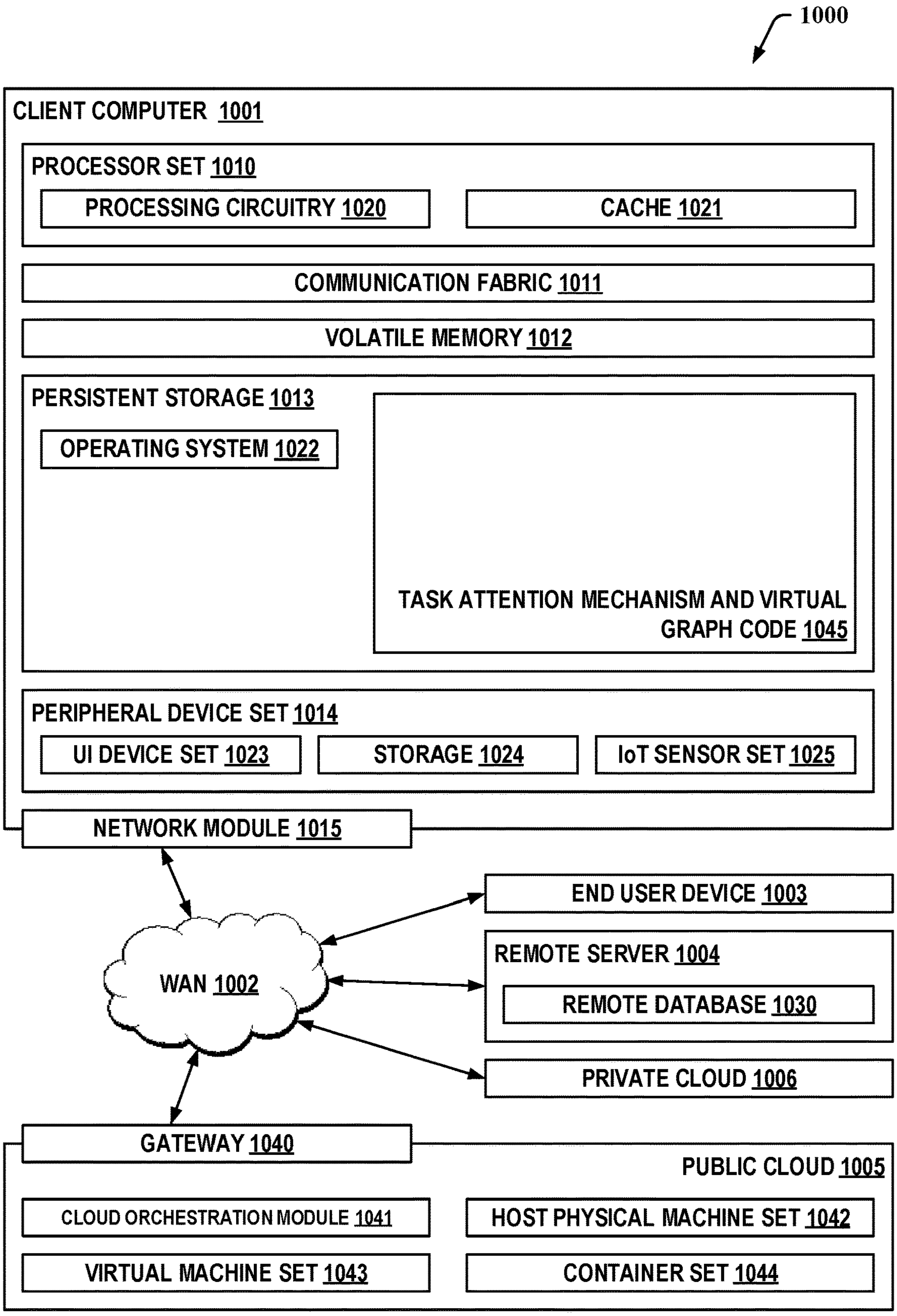
FIG. 10 illustrates a block diagram of an example, non-limiting operating environment in which one or more embodiments described herein can be facilitated.

FIG. 10 illustrates a block diagram of an example, non-limiting operating environment 1000 in which one or more embodiments described herein can be facilitated. FIG. 10 and the following discussion are intended to provide a general description of a suitable operating environment 1000 in which one or more embodiments described herein at FIGS. 1-9 can be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1000 contains an example of an environment for the execution of at least some of the computer code involved in performing the inventive methods, such as task attention mechanism and virtual graph code 1045. In addition to block 1045, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1045, as identified above), peripheral device set 1014 (including user interface (UI), device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 1045 in persistent storage 1013.

COMMUNICATION FABRIC 1011 is the signal conduction paths that allow the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface type operating systems that employ a kernel. The code included in block 1045 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

The computer 1001 in some embodiments also hosts one or more machine learning models to perform the methods described herein. One or more machine learning models, in one embodiment, are stored in the persistent storage 1013 of the computer 1001. A received data sample is input to the machine learning model via an intra-computer transmission within the computer 1001, e.g., via the communication fabric 1011, to a different memory region hosting the machine learning model.

In some embodiments, one or more machine learning models are stored in computer memory of a computer positioned remotely from the computer 1001, e.g., in a remote server 1004 or in an end user device 1003. In this embodiment, the code 1045 works remotely with this machine learning model to train and use same. Training and/or inference instructions are sent via a transmission that starts from the computer 1001, passes through the WAN 1002, and ends at the destination computer that hosts the machine learning model. Thus, in some embodiments the code 1045 at the computer 1001 or another instance of the software at a central remote server performs routing of training instructions to multiple server/geographical locations in a distributed system.

In such embodiments, a remote machine learning model is configured to send its output back to the computer 1001 so that query responses generated from providing input to the trained model are provided and then presented to a user. The machine learning model(s) receive a copy of the new input data, perform machine learning analysis on the received sample, and transmit the results, e.g., predictions, back to the computer 1001.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms “component,” “system,” “platform” and/or “interface” can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term “or” is intended to mean an inclusive “or” rather than an exclusive “or.” That is, unless specified otherwise, or clear from context, “X employs A or B” is intended to mean any of the natural inclusive permutations. That is, if X employs A; X employs B; or X employs both A and B, then “X employs A or B” is satisfied under any of the foregoing instances. Moreover, articles “a” and “an” as used in the subject specification and annexed drawings should generally be construed to mean “one or more” unless specified otherwise or clear from context to be directed to a singular form. As used herein, the terms “example” and/or “exemplary” are utilized to mean serving as an example, instance, or illustration. For the avoidance of doubt, the subject matter described herein is not limited by such examples. In addition, any aspect or design described herein as an “example” and/or “exemplary” is not necessarily to be construed as preferred or advantageous over other aspects or designs, nor is it meant to preclude equivalent exemplary structures and techniques known to those of ordinary skill in the art.

As it is employed in the subject specification, the term “processor” can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as “store,” “storage,” “data store,” data storage,” “database,” and substantially any other information storage component relevant to operation and functionality of a component are utilized to refer to “memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A computer-implemented method comprising:

receiving, by a processor executing a first language machine learning model, first text data;

determining, by the processor, that a token length of the first text data exceeds a predefined maximum token length supported by the first language machine learning model;

in response to determining that the token length exceeds the predefined maximum token length, automatically transforming, by the processor, the first text data into a first logical graph representation that:

(i) represents all tokens of the first text data as nodes and logical relationships between the tokens as edges, (ii) preserves semantic relationships of the first text data without truncating or eliminating any portion of the first text data, and (iii) converts textual sequence distances into logical graph distances independent of token length constraints;

storing the first logical graph representation in computer memory accessible to the first language machine learning model as a structured internal knowledge representation; and in response to receiving a query, generating a second logical graph representation from the query and performing graph structure matching between the second logical graph representation and the first logical graph representation to identify a matching subgraph used to generate a response via the first language machine learning model.

2. The computer-implemented method of claim 1, wherein the generating the first logical graph comprises:

generating, via the machine learning model, subtexts from the portion of the first text data that exceeds the predefined maximum token length of the first language machine learning model;

generating, via the machine learning model, respective logical subgraphs from the subtexts; and combining, via the machine learning model, the respective logical subgraphs to form the first logical graph.

3. The computer-implemented method of claim 2, wherein the respective logical subgraphs are generated based on a prompt template that is input into the first language machine learning model.

4. The computer-implemented method of claim 2, wherein the subtexts are generated from the first text data via a semantic integrity-driven sliding window comprising a lightweight pointer neural network.

5. The computer-implemented method of claim 4, wherein an input to the lightweight pointer neural network is sequence data, and wherein an output of the lightweight pointer neural network is a probability value that indicates whether semantic integrity of the first text data is preserved during truncation of the first text data into the subtexts.

6. The computer-implemented method of claim 1, wherein the first logical graph is formed further by converting textual distances in the first text data into logical distances in the first logical graph without limiting the first logical graph by the token length of the first text data.

7. The computer-implemented method of claim 1, further comprising storing a long-term memory of the first language machine learning model to operate as a task attention mechanism of the first language machine learning model.

8. The computer-implemented method of claim 1, wherein the first logical graph is stored in computer memory and serves as a logical index of knowledge comprised in the first text data for generating the responses to the one or more queries.

9. A computer system, comprising:

a processor set;

a set of one or more computer-readable storage media storing program instructions, a first language machine learning model executable by the processor set, to cause the processor set to perform computer operations comprising:

receiving first text data;

determining that a token length of the first text data exceeds a maximum token length supported by the first language machine learning model;

in response to the token length exceeding the maximum token length, invoking a graph construction component to generate a first logical graph representation of the first text data, the first logical graph representation:

(i) comprising nodes corresponding to tokens of the first text data and edges corresponding to logical relationships between the tokens, (ii) preserving semantic content of the first text data without truncating or eliminating any portion of the first text data, and (iii) representing relational proximity between portions of the first text data independently of token position limits;

storing the first logical graph representation in a graph memory region distinct from a token context memory of the first language machine learning model; and responsive to receipt of a query, accessing the graph memory region to retrieve one or more logically related portions of the first logical graph representation for use by the first language machine learning model in generating a response.

10. The computer system of claim 9, wherein the generating the first logical graph comprises:

generating, via the machine learning model, subtexts from the first text data that exceeds the predefined maximum token length;

generating, via the machine learning model, respective logical subgraphs from the subtexts; and combining, via the machine learning model, the respective logical subgraphs to form the first logical graph.

11. The computer system of claim 10, wherein the respective logical subgraphs are generated based on a prompt template that is input into the first language machine learning model.

12. The computer system of claim 10, wherein the subtexts are generated from the first text data via a semantic integrity-driven sliding window comprising a lightweight pointer neural network.

13. The computer system of claim 9, wherein the first logical graph is formed further by converting textual distances in the first text data into logical distances in the first logical graph without limiting the first logical graph by the token length of the first text data.

14. The computer system of claim 9, wherein the first logical graph is stored in computer memory and serves as a logical index of knowledge comprised in the first text data for generating the responses to the one or more queries.

15. The computer system of claim 9, wherein generating the responses comprises:

restoring continuous first text data from the first logical graph by inputting a matching portion of the first logical graph into a second language machine learning model; and inputting the continuous first text data and the one or more queries into the first language machine learning model.

* * * * *